(12) United States Patent
Koziol

(10) Patent No.: US 11,794,712 B2
(45) Date of Patent: Oct. 24, 2023

(54) DETECTION DEVICE AND METHOD

(71) Applicant: Westinghouse Air Brake Technologies Corporation, Wilmerding, PA (US)

(72) Inventor: Michael Koziol, Wilmerding, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 393 days.

(21) Appl. No.: 17/011,752

(22) Filed: Sep. 3, 2020

(65) Prior Publication Data
US 2021/0061247 A1 Mar. 4, 2021

Related U.S. Application Data

(60) Provisional application No. 62/895,586, filed on Sep. 4, 2019.

(51) Int. Cl.
*B60T 17/22* (2006.01)
*F16D 66/02* (2006.01)
*B60T 17/08* (2006.01)

(52) U.S. Cl.
CPC ............ *B60T 17/22* (2013.01); *F16D 66/027* (2013.01); *B60T 17/085* (2013.01)

(58) Field of Classification Search
CPC ....... F16D 66/027; B60T 17/22; B60T 17/085
See application file for complete search history.

(56) References Cited

U.S. PATENT DOCUMENTS

| | | | | |
|---|---|---|---|---|
| 6,352,137 B1* | 3/2002 | Stegall | ..................... | F16D 65/28 188/1.11 E |
| 8,006,815 B2 | 8/2011 | Sommerfeld et al. | | |
| 2011/0308897 A1* | 12/2011 | Wallace | ................. | F16D 65/28 188/1.11 R |
| 2016/0075320 A1* | 3/2016 | Finch, Jr. | ................ | F16D 66/00 188/153 R |

OTHER PUBLICATIONS

European Patent No. EP 3392106 published Apr. 17, 2018 to Gentzsch et al.*

* cited by examiner

*Primary Examiner* — Pamela Rodriguez
(74) *Attorney, Agent, or Firm* — THE SMALL PATENT LAW GROUP LLC; Philip S. Hof

(57) ABSTRACT

A brake assembly includes a first assembly component; a second assembly component that is movable with respect to the first assembly component; and a device for determining a status of the brake assembly. The device includes a sensor trigger disposed on the second assembly component; a sensor disposed on the first assembly component, the sensor being configured to detect a proximity of the sensor trigger with respect to the sensor; and a controller in communication with the sensor and configured to determine the status of the brake assembly based on the detected proximity of the sensor trigger with respect to the sensor.

20 Claims, 19 Drawing Sheets

DETECTION DEVICE AND METHOD

CROSS-REFERENCE TO RELATED APPLICATIONS

This application claims priority to U.S. Provisional Application No. 62/895,586, which was filed on 4 Sep. 2019, and the entire disclosure of which is incorporated herein by reference.

BACKGROUND

Technical Field

The subject matter described herein relates to a detection device and method for determining a status of a vehicle brake system.

Description of Art

Vehicle brake systems may include hand or manually actuated brake mechanisms. A hand or manually actuated brake that is unknowingly left applied on a vehicle can cause damage to the vehicle and/or the route, surface, or track on which the vehicle travels is the vehicle is moved with the brake engaged. Detection systems or devices may incorporate sensors or instrumentation assembled directly onto the hand or manually actuated brake mechanism. To implement such a detection system or device on an existing vehicle, it may be necessary to replace the hand or manually actuated brake mechanism with an entirely new mechanism incorporating the detection system or device.

It may be desirable to have a system or method for detecting aspects of a brake assembly that differs from those that are currently available.

BRIEF SUMMARY

According to one embodiment, a system including a brake assembly is provided. The system may include a first assembly component and a second assembly component. At least one of the first assembly component and the second assembly component may be movable with respect to each other. A status detector is provided that includes a sensor trigger disposed on the second assembly component and a sensor disposed on the first assembly component. The sensor may detect a proximity of the sensor trigger with respect to the sensor. A controller is provided and is in communication with the sensor. The controller may determine the status or mode of the brake assembly based at least in part on the detected proximity of the sensor trigger with respect to the sensor.

According to an example of the disclosure, a brake assembly is provided. The brake assembly may include a first assembly component; a second assembly component that is movable with respect to the first assembly component; and a device for determining a status of the parking brake assembly. The device may include a sensor trigger disposed on the second assembly component; a sensor disposed on the first assembly component, the sensor being configured to detect a proximity of the sensor trigger with respect to the sensor; and a controller in communication with the sensor and determine the status of the parking brake assembly based on the detected proximity of the sensor trigger with respect to the sensor.

The controller may determine an application status of the parking brake assembly based on the detected proximity of the sensor trigger with respect to the sensor, and/or the controller may determine an operating status of the parking brake assembly based on the detected proximity of the sensor trigger with respect to the sensor.

The device may include a housing for mounting the sensor on the first assembly component, the sensor being disposed within the housing; and a carrier for mounting the sensor trigger on the second assembly component, the sensor trigger being disposed on the carrier. The first assembly component may include a brake cylinder, and the second assembly component may include a piston rod extensibly disposed on the brake cylinder. The device may include a sealed housing and mounting plate for mounting the sensor on a non-pressure head of the brake cylinder, the sensor being disposed within the sealed housing; and a carrier pin for mounting the sensor trigger on the piston rod. The sealed housing may include a connector for communicating the sensor to the controller. The sensor may communicate with the controller via a train line electronics system of a vehicle, and the controller may communicate with a notification device such that the determined status of the parking brake assembly can be communicated to a vehicle operator.

A status detector of a vehicle brake system is provided. The status detector may include a sensor that may be disposed on a first component of the vehicle brake system; a sensor trigger that may be disposed on a second component of the vehicle brake system that is movable with respect to the first component; and a controller in communication with the sensor. The sensor may detect a proximity of the sensor trigger with respect to the sensor, and the controller may determine the status of the vehicle brake system based on the detected proximity of the sensor trigger with respect to the sensor.

The controller may determine an application status of the vehicle brake system based on the detected proximity of the sensor trigger with respect to the sensor, and/or the controller may determine an operating status of the vehicle brake system based on the detected proximity of the sensor trigger with respect to the sensor.

The device may include a housing for mounting the sensor on the first component, the sensor being disposed within the housing. The housing may include a connector for the sensor to communicate with the controller. The device may include a carrier for mounting the sensor trigger on the second component, the sensor trigger being disposed on the carrier. The sensor may be disposed on a stationary component of a parking brake assembly, and the sensor trigger may be disposed on a movable component of the parking brake assembly. The sensor may be disposed on a brake cylinder of the parking brake assembly, and the sensor trigger may be disposed on a piston rod of the parking brake assembly. The controller may communicate with a notification device such that the determined status of the vehicle brake system can be communicated to a vehicle operator.

According to an example of the disclosure, a method of determining a status of a vehicle brake system is provided. The method may include providing a sensor and a sensor trigger; mounting the sensor on a first component of the vehicle brake system; disposing the sensor trigger on a second component of the vehicle brake system, the second component being movable with respect to the first component; communicating the sensor with a controller; detecting a proximity of the sensor trigger with respect to the sensor; communicating the detected proximity of the sensor trigger with respect to the sensor to the controller; and determining the status of the vehicle brake system based on the detected proximity of the sensor trigger with respect to the sensor.

The method may include notifying the determined status of the vehicle brake system to a vehicle operator. The determined status of the vehicle brake system may be an application status of the vehicle brake system and/or an operating status of the vehicle brake system.

DETAILED DESCRIPTION

Figure 1:
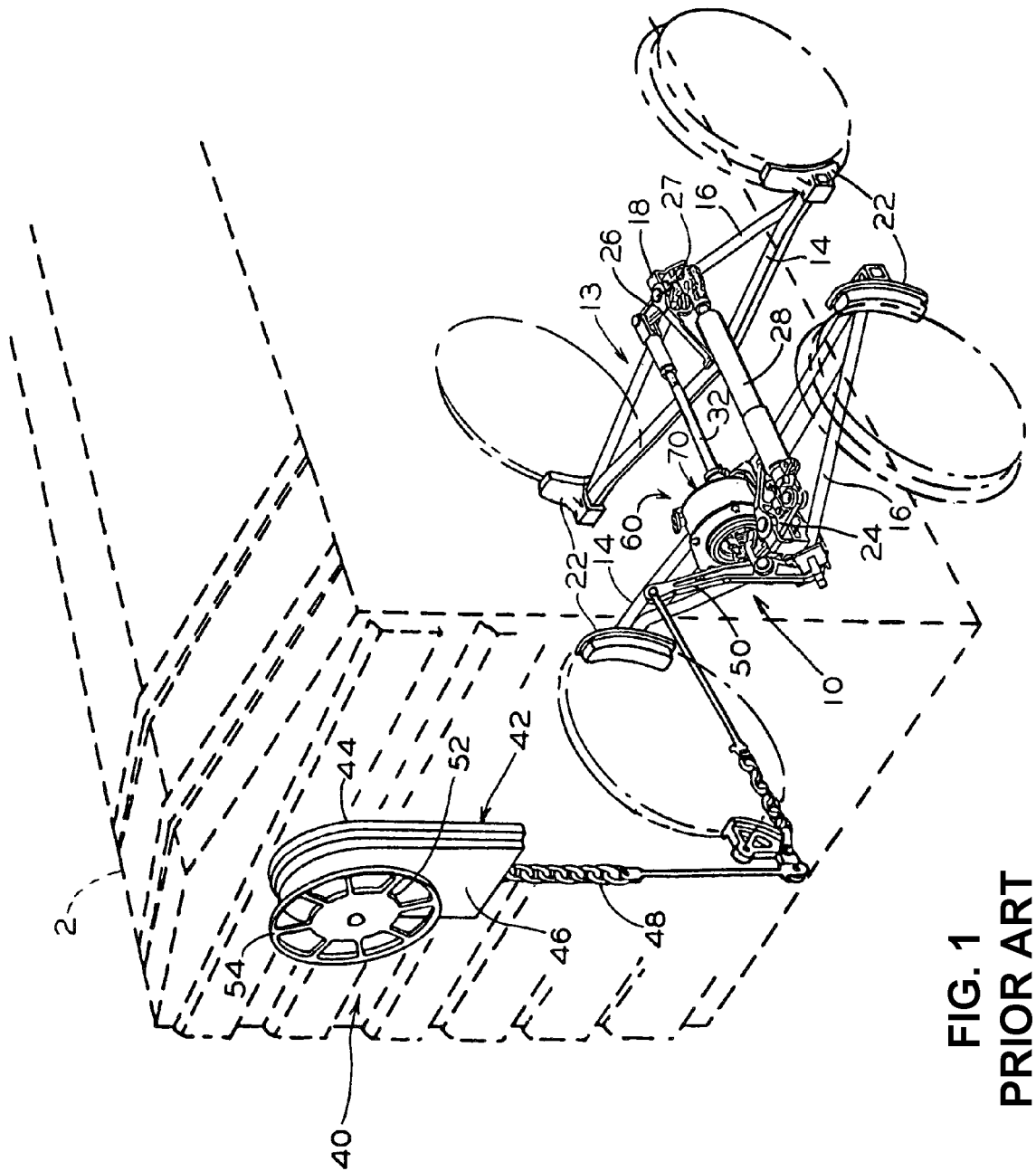
FIG. 1 is a perspective view of a truck-mounted brake rigging including a parking brake assembly with a hand brake apparatus installed on a vehicle shown in phantom.
Figure 2:
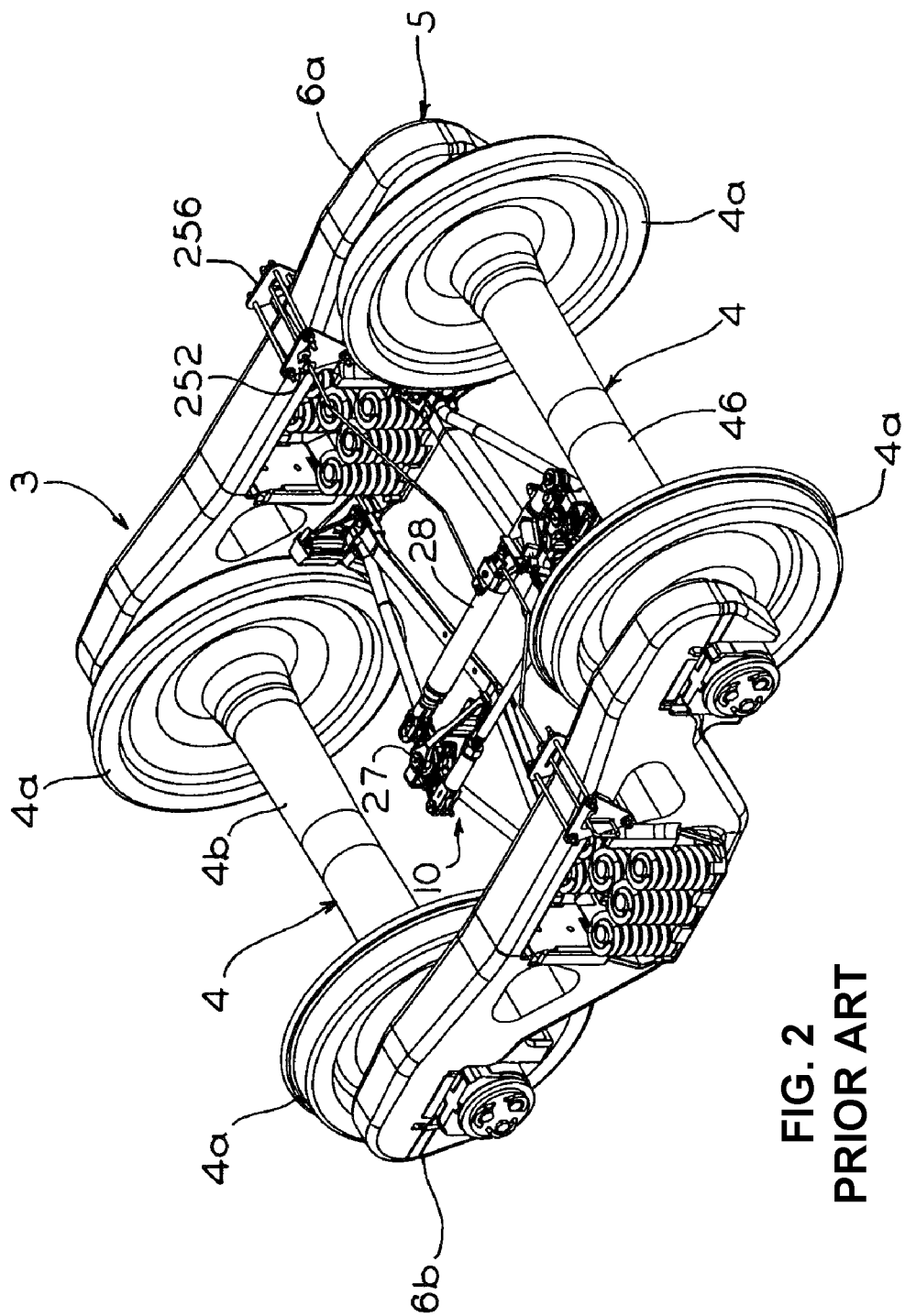
FIG. 2 is a perspective view of a parking brake assembly installed within a truck apparatus of the vehicle shown in FIG. 1.
Figure 3:
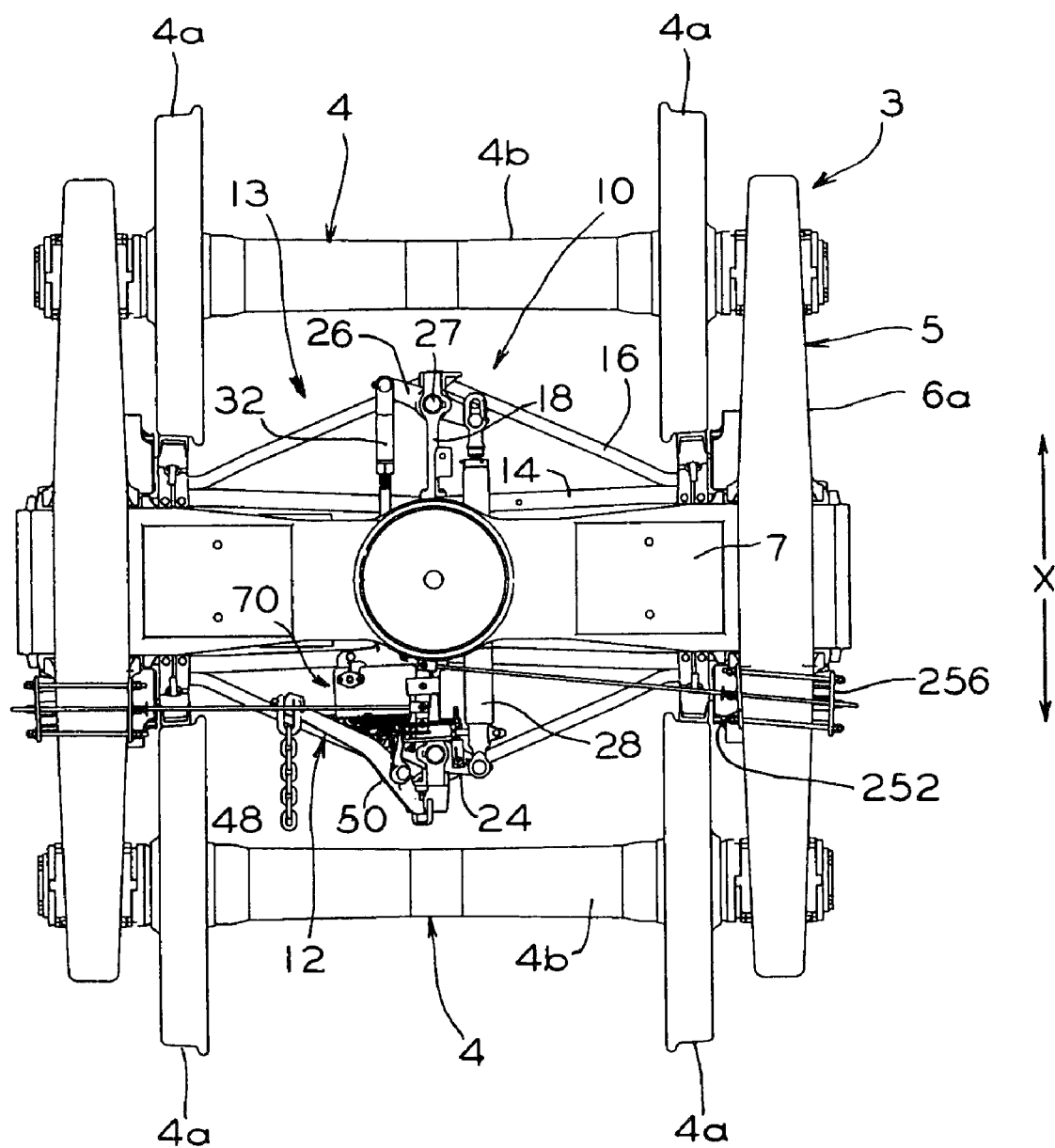
FIG. 3 is a top view of the parking brake assembly of FIG. 2.
Figure 4:
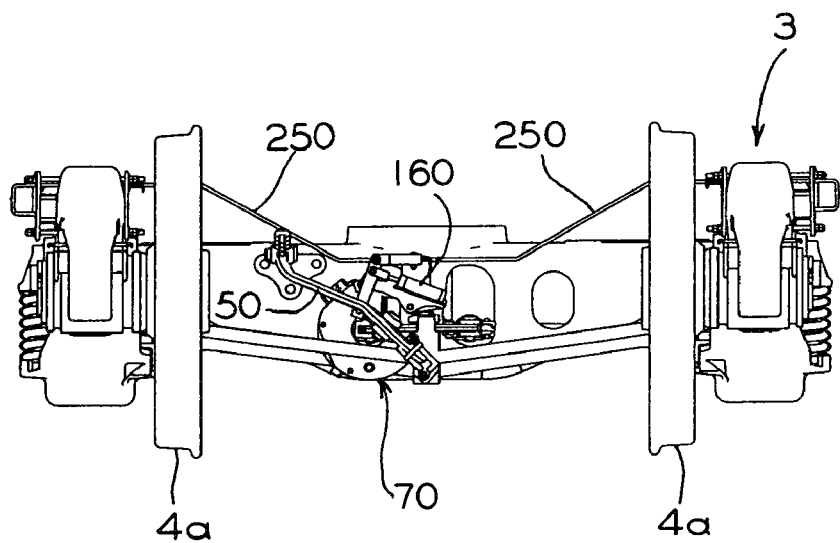
FIG. 4 is a front view of the parking brake assembly of FIG. 2.
Figure 5:
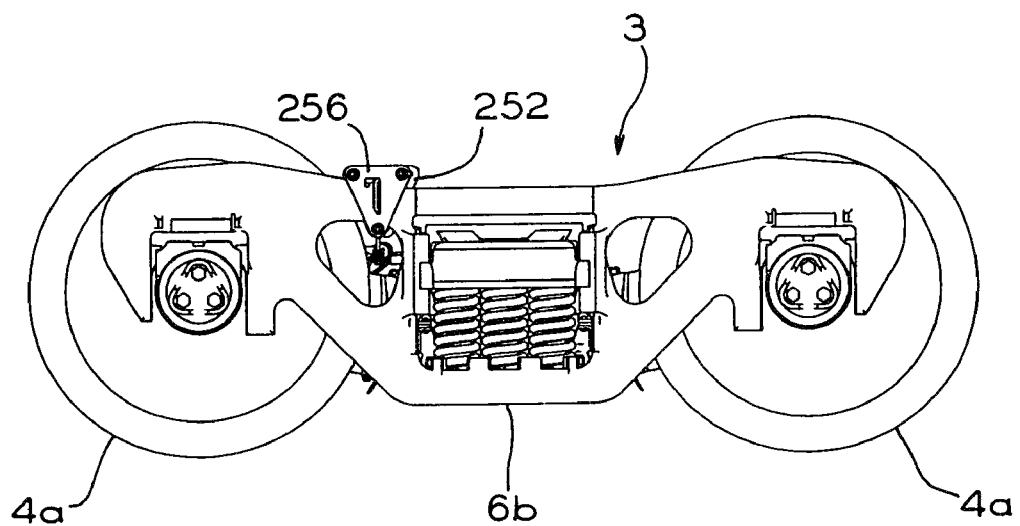
FIG. 5 is a side view of the parking brake assembly of FIG. 2.

Referring to FIGS. 1-5, a truck-mounted brake rigging 10 is shown for a vehicle 2 according to one example of U.S. Pat. No. 8,006,815. The vehicle 2 may be a railway car or another type of vehicle, such as an automobile, truck, mining vehicle, agricultural vehicle, or the like. The brake rigging 10 is installed within a truck apparatus 3 carrying one end of the vehicle body. The truck apparatus may include a pair of wheel sets 4, with each set having a pair of wheels 4a joined by an axle 4b and a frame 5 supported by the pair of wheel sets. The frame may include a pair of side members 6a and 6b joined by a bolster 7.

The brake rigging 10 may include brake beams 12, 13, which are identical or substantially identical. Each brake beam can include a compression member 14, a tension member 16, and a strut member 18. The opposite ends of the compression member and the tension member may be permanently connected together. Mounted on the respective ends of the brake beams are brake heads 22. At a location midway between opposite ends, the compression member and the tension member of the respective brake beams are spaced apart sufficiently to allow connection of the strut member therebetween.

A pair of force-transfer levers 24, 26 is pivotally connected by pins 27 to the strut member of the respective brake beams. One end of the force-transfer levers is interconnected via a force-transmitting member 28, which may be in the form of an automatic slack adjuster device. The opposite end of the respective force-transfer levers is connected to the pressure head of the brake actuator 70 via the force-transmitting member or a return push rod assembly 32.

Figure 11:
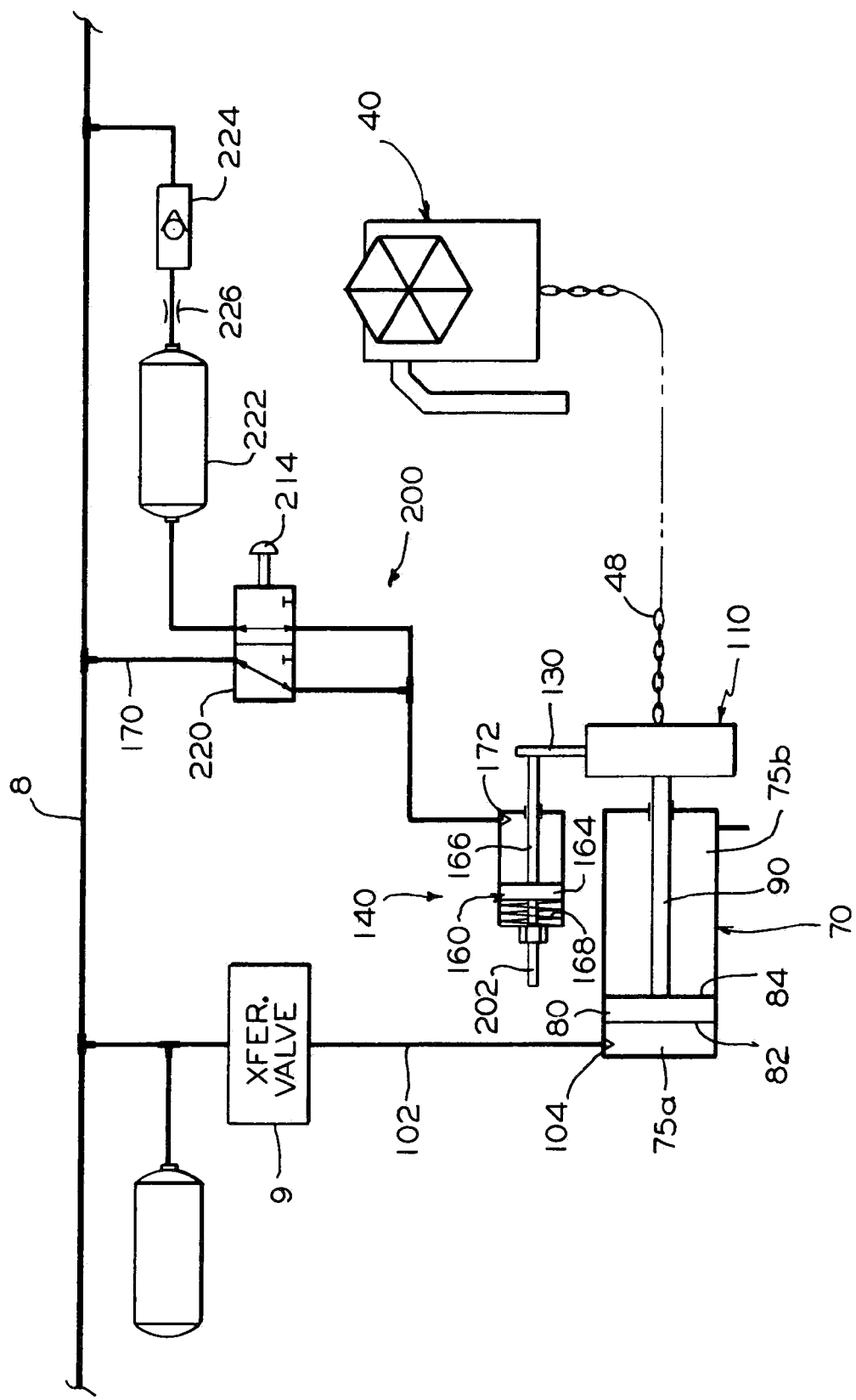
FIG. 11 is a schematic block diagram of the parking brake assembly illustrating a pneumatically operated manual release arrangement.
Figure 12:
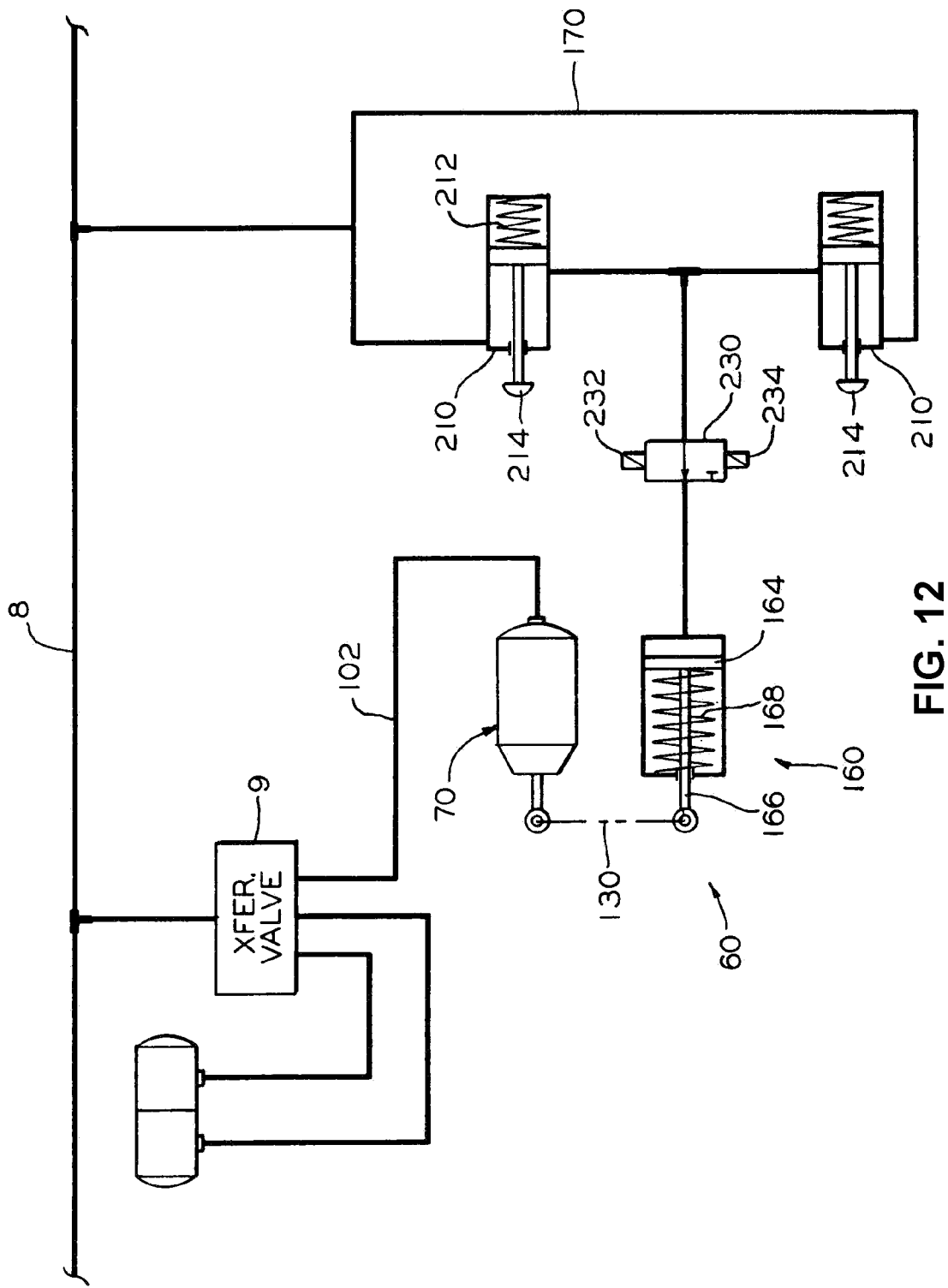
FIG. 12 is a schematic block diagram of the parking brake assembly illustrating another pneumatically operated manual release arrangement.

When a brake application is made, reduction of the fluid pressure in a brake pipe 8 causes, through a transfer valve 9 shown in FIGS. 11 and 12, pressurization of the brake actuator. This results in movement of the brake actuator piston within the housing that the piston is mounted. This movement of the piston causes a spring, also mounted within the housing of the brake cylinder assembly, to compress, resulting in movement of a push rod 30, which is attached to the force-transfer lever 24, in a first direction to effect counterclockwise rotation of the force-transfer lever 24. The force-transfer lever in turn actuates the slack adjuster assembly to effect counterclockwise rotation of the other force-transfer lever 26 and consequent actuation of the return push rod assembly.

The force-transfer levers, along with the slack adjuster assembly, the return push rod assembly, and the brake actuator include a brake beam actuating linkage that interconnects the brake beams via pivot pins 27 and, thus, the required brake actuation forces effectively act along these pins. The resultant of these forces is shown at X in FIG. 3. Since the length of the slack adjuster assembly increases with actuation of the brake actuator piston rod, the brake beams are moved apart by the brake beam linkage until the brake shoe engagement with the tread surface of the vehicle wheels occurs. When the fluid pressure is evacuated from the brake actuator due to the reduction of the fluid pressure in the brake pipe and operation of the transfer valve, the push rod moves in an opposed second direction, causing the brake rigging to release the brakes.

During a parking situation when the vehicles are parked at a siding or yard, for example, the pneumatic braking system described above can no longer be used. Thus, a hand brake mechanism mounted on each vehicle can be employed to apply the brake as a precaution against unwanted or unexpected movement of the vehicles.

In FIG. 1, an example hand brake mechanism 40 is shown. The hand brake mechanism has a housing 42 which may include a back plate or wall 44, mountable on a vehicle 2, and a cover 46 which is secured to the back wall. A chain 48 for application or release of the brakes is connected to the brake rigging via a hand brake lever 50 and wound on a winding drum 52. The hand brake lever is, in turn, connected to the brake actuator transfer lever or force-transfer lever.

To apply the brakes, a hand wheel 54 is rotated in a clockwise direction, as viewed in FIG. 1, to wind the chain about the winding drum and to cause the hand brake lever to be pulled in an outward direction away from the brake rigging. This movement causes the force-transfer lever 24 to be rotated in a counterclockwise direction, resulting in the push rod being pulled in an outward direction and the required force being applied to the slack adjuster assembly. This applied force is similar to the force which is applied by the brake actuator push rod of the brake actuator when such is pressurized. However, it has been found that operators may apply the hand brake and forget to release the brake via the mechanical release of the hand brake, a handbrake unknowingly left applied on a vehicle that is moved can cause damage to the vehicle and/or the route, surface, or track on which the vehicle travels. Furthermore, by sending the applied or released position of the brakes to the operator of the vehicle or vehicle system (that includes the vehicle), this undesired/costly damage can be prevented.

In contrast, and with reference to FIGS. 2 through 11, an example of a parking brake assembly 60 is shown and may include the brake actuator. The brake actuator has a housing 72 mounted on the first brake beam 12 adjacent the pivotal connection of the force-transfer lever 24. The housing 72 has a first end 73 and an opposed second end 74. The first end is provided with mounting member 73a for stationarily securing the brake actuator onto the beam 12. The first end of the housing 72 is closed, while the second end 74 may be open. A fluid-pressure-operable piston assembly 80 is mounted for a longitudinal reciprocal motion within the housing 72. The piston assembly divides the housing 72 into (a) a pressurized portion 75a disposed intermediate or between the first end 73 of the housing 72 and the first end 82 of the piston 80 and (b) a non-pressurized portion 75b disposed adjacent the second end 74 of the housing 72. A piston rod 90 is secured at a first end 92 of the piston rod to a second end 84 of the piston assembly. The piston rod can extend through the axial opening 76 in the second end 74 of the housing 72 responsive to a supply of fluid pressure into the pressurized portion 75a. The piston rod is secured at a second end 94 of the piston rod to a first end of the push rod. The piston rod and the piston assembly move with the push rod in the first and second directions.

In response to the supply of fluid pressure into the pressurized portion of the housing 72, the piston assembly moves in the first direction toward the second end 74 of the housing 72. This can cause the piston rod and the push rod to move in the first direction and increase the length of the force-transmitting member to accordingly increase the spaced-apart distance between the first and second brake beams 12 and 13, respectively, in order to apply a braking force.

A spring or spring member 100 is disposed in the non-pressurized portion of the housing 72 and is caged between an inner surface 77 of the second end of the housing 72 and the second end of the piston assembly. The spring member 100 can exert a force against the piston assembly upon release of the spring member responsive to evacuation of the fluid pressure from the pressurized portion of the housing. This can cause longitudinal movement of the piston assembly in the second direction within the housing 72 to retract the piston rod into the housing 72. Accordingly, the push rod also will move in the second direction and release the applied braking force.

A fluid communication device 102, including an air pressure inlet 104, is provided in fluid communication with the pressurized portion of the housing 72 and with the brake pipe for supplying the fluid pressure to the parking brake actuator during brake application of the brake rigging. This results in the longitudinal movement of the piston assembly and the piston rod in the first direction and in compression of the spring member. The fluid communication device is provided for evacuating the fluid pressure from the pressurized portion of the housing 72 during brake release, resulting in the longitudinal movement of the piston assembly and the piston rod in the second direction due to the force exerted by the released spring member.

The parking brake assembly further may include a clamping device 110 that maintains the extended position of the push rod during reduction of the fluid pressure in the brake pipe to a predetermined level and for releasing the push rod to move in the second direction due to the increase of the fluid pressure in the brake pipe above such predetermined level.

In accordance with an example, the clamping device may include a first elongated thread 112 formed on at least a portion of the exterior surface of the piston rod movable through the non-pressurized portion of the housing 72. A ratchet 114 is mounted within the non-pressurized portion of the housing 72 for rotation about a longitudinal axis of the piston rod. A pair of optional bearings 115 may be provided for facilitating rotation of the ratchet. An aperture is axially formed through the ratchet. A second thread is formed on a surface of the axial aperture for operable engagement with the first thread. There is a shaft 120 which is mounted for rotation in a spaced relationship with the ratchet. The rotational axis of the shaft is substantially parallel to a rotational axis of the ratchet. The shaft has a first end 122 disposed within the non-pressurized portion of the housing 72 and has a second end 124 thereof extending through an aperture 126 formed through the second end of the housing 72 past an outer surface thereof. Finally, a holding pawl is disposed within the non-pressurized portion of the housing 72 and is secured to the shaft for rotation therewith. The holding pawl is rotatable in a first rotational direction for engagement with the ratchet teeth when a first rotational force is applied to the second end of the shaft due to the fluid pressure in the brake pipe being reduced to a predetermined level. This engagement prevents movement of the push rod in the second direction. The holding pawl is rotatable in a second rotational direction for disengaging the ratchet teeth and permitting the push rod to move in the second direction when a second rotational force is applied to at least one of the shaft or the holding pawl due to the increase of the fluid pressure in the brake pipe.

To mount the clamping device, the second end of the housing 72 is formed by the first member carrying the outer surface thereon and a second member 74b secured in spaced relationship with the first member 74a. The ratchet and the holding pawl are mounted intermediate the first and the second members. The first and the second members are bolted to a flange 72a of the housing 72.

The rotational force may be applied to the second end of the shaft. An operating lever 130 can have a first end 132 disposed on and secured to the second end of the shaft for rotation of the shaft. The operating lever can be rotatable in the first rotational direction when the first rotational force is applied to a second end 134 of the operating lever, and is rotatable in the second rotational direction when the second rotational force is applied to the second end.

An operating device 140 may respond to a fluid pressure condition within the brake pipe for selectively and automatically operating the clamping device to maintain the push rod, after movement of the push rod in the first direction, in the position for applying brakes and to release the push rod for movement in the second direction.

Figure 7:
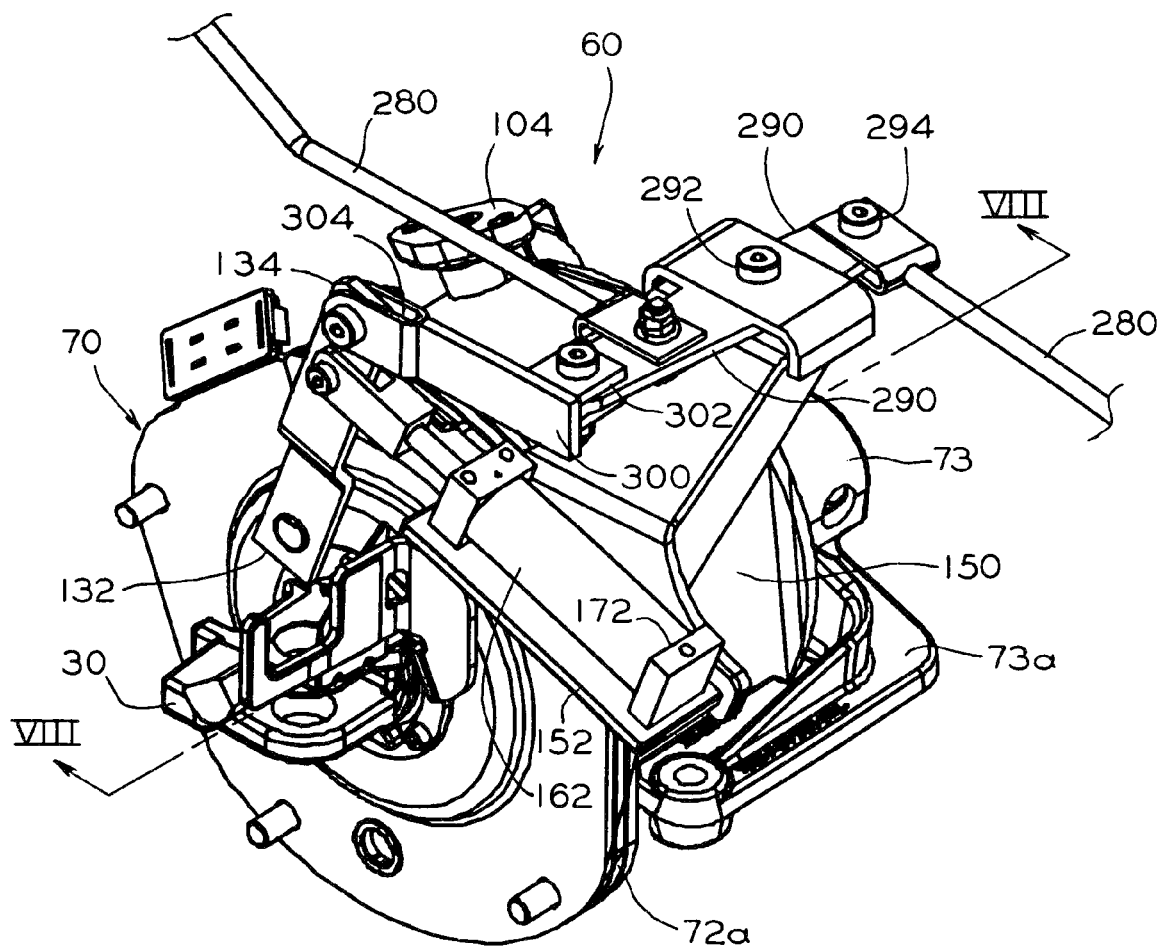
FIG. 7 is an enlarged perspective view of a brake actuator employed within the parking brake assembly.

Now with specific reference to FIGS. 7 and 11, the operating device may include a mounting bracket 150 affixed to the outer surface of the second end of the housing 72 (e.g., using fasteners that attach the first and second members to the flange). When installed, the mounting bracket is disposed in a vertical or generally vertical plane (e.g., a plane that is vertical or that is closer to vertical than horizontal). The mounting bracket may be provided with a ledge portion 152 disposed horizontally or generally horizontally (e.g., the ledge is oriented horizontally or closer to horizontal than vertical).

A pneumatically operated cylinder 160 can be mounted on the ledge portion of the mounting bracket. The pneumatically operated cylinder has a casing 162, a piston assembly 164 mounted for a longitudinal movement within the casing, a piston rod 166 connected at a first end to a first end of the piston assembly and pivotally connected at a second end to the second end 134 of the operating lever 130, and a spring 168 which is caged within the casing between an end of the casing and the second end of the piston assembly. When installed within the vehicle, the piston assembly and piston rod move in a direction which is generally perpendicular to the movement direction of the piston assembly, piston rod, and push rod, as well as to the rotational axis of the ratchet and the holding pawl.

A fluid communication device 170 includes a fluid port 172 that is in fluid communication with a second end of the piston assembly and with the brake pipe. The fluid communication device can be a reservoir, conduit, or the like. The fluid communication device can supply the fluid pressure to a second end of the piston assembly to cause the piston rod to outwardly move and apply the second rotational force. Furthermore, the fluid communication device can evacuate the fluid pressure from the second end of the piston assembly when the fluid pressure in the brake pipe is reduced below the predetermined level. This can cause the spring 168 to extend and retract the piston rod into the casing, thus applying the first rotational force to the second end of the lever.

In normal operation, while the vehicle is moving and/or while the fluid pressure in the brake pipe is at or above an upper threshold (e.g., a maximum pressure of the brake pipe, which may be ninety pounds per square inch), the spring member 100 of the parking brake actuator is extended and the brakes are released. Consequently, the fluid pressure from the brake pipe is supplied to the pneumatically operated cylinder, causing the piston rod to apply a second rotational force to the operating lever. This prevents the holding pawl from engaging the ratchet.

When a partial brake application (e.g., a ten pound per square inch reduction from the upper threshold in the brake pipe fluid pressure) or a full service brake application (e.g., a twenty-five pound per square inch reduction in the brake pipe fluid pressure from the upper threshold) is commanded from the vehicle, the fluid pressure is supplied to the pressurized portion of the housing 72. This can cause the piston assembly 80 to move in the first direction toward the second end of the housing 72 and against the resistance of the spring member 100. This also can cause the piston rod and the push rod to move in the first direction and apply the brakes. When a brake release is commanded and the fluid pressure in the brake pipe begins to rise, the fluid pressure is evacuated from the pressurized portion of the housing 72 though the directional or transfer valve, causing the spring member 100 to extend, moving the push rod in the second direction, and releasing the brake force. As long as the fluid pressure in the brake pipe is above the determined level, the piston rod continues to apply the second rotational force to the operating lever, thus preventing the holding pawl from engaging ratchet teeth.

When the fluid pressure in the brake pipe reduces below the predetermined level, which is generally set below the level present in full service brake application, the fluid pressure is evacuated from the pneumatically operated cylinder. This causes the spring 168 to extend and retract the piston rod into the casing, applying the first rotational force to the second end of the lever, and engaging the holding pawl with the ratchet. Because the brake actuator moves the push rod in the first direction to apply braking force, the engagement of the holding pawl with the ratchet maintains the push rod in this brake-applied condition. The ratchet teeth are formed so that the ratchet rotates to allow movement of the push rod in the first direction even while the holding pawl engages the ratchet prior to the push rod, completing its movement to apply brakes.

When the supply of the fluid pressure to the cylinder is restored, the piston rod will move outwardly from the casing 162 and apply a second rotational force to the operating lever 130. This disengages the holding pawl from the ratchet. The predetermined fluid pressure level in the brake pipe at which the holding pawl engages the ratchet is also dependent on the rate or rating of the spring, as well as on specific application requirements. For example, it may be desirable for the holding pawl to engage the ratchet only during a rapid fluid pressure decrease (e.g., an emergency brake application when the fluid pressure in the brake pipe reduces to about ten pounds per square inch and then to zero pounds per square inch).

It is also within the scope of the example to evacuate fluid pressure from and re-supply the evacuated fluid pressure to the pneumatically operated cylinder 160 at different pressure levels within the brake pipe. For example, prior to disengaging the holding pawl from the ratchet, the fluid pressure in the brake pipe may be increased (e.g., to a pressure of ten pounds per square inch to thirty pounds per square inch).

While the above-described operation provides for automatic application and release of the brakes, a manually operable release device 200 may be provided. The release device may be coupled to the pneumatically operated cylinder for manually releasing the push rod to move in the second direction. According to an example, the manually operable release device may include a release shaft 202 in secured threaded engagement to the casing 162 of the pneumatically operated cylinder. The release shaft has a first end coaxially secured to the second end of the piston 164 and having a second end extending outwardly from the casing 162. Selective manual rotation of the second end of the release shaft causes extension or retraction of the piston rod, which rotates the operating lever 130 in the first or second rotational directions.

According to an example, the manually operable release device may include a valve 210, shown in FIG. The valve 210 can be disposed within the fluid communication device intermediate or between the brake pipe and the pneumatically operated cylinder 160. In a first position, the valve 210 supplies or directs supply of the fluid pressure to the pneumatically operated cylinder 160 while the fluid pressure in the brake pipe is maintained above the predetermined level. In this position, the fluid pressure compresses an extension spring 212 mounted within the valve 210. This compression allows the fluid pressure to flow through to the pneumatically operated cylinder.

In a second position, the valve 210 discontinues or stops the supply of fluid pressure to the pneumatically operated cylinder 160 due to release of the compressed spring 212. The valve 210 can exhaust the fluid pressure from the pneumatically operated cylinder 160 (e.g., to the atmosphere). When the fluid pressure decreases below the predetermined set level, the spring 212 extends and the valve 210 blocks the flow of the fluid pressure through the valve 210 and opens passage to an exhaust port of the valve 210.

The valve 210 also may include a manually operable device, such as a pushbutton 214, for manually restoring the supply of the fluid pressure to the pneumatically operated cylinder 160. Manual actuation of the device 214 compresses the spring 212 to allow the flow of the fluid pressure through the valve 210. The valve 210 keeps the spring 212 in a compressed condition when the pushbutton 214 is released.

A pair of valves 210 may be provided, each installed adjacent a respective end of the vehicle to reduce the labor of releasing the applied parking brake assembly by eliminating the need for the operator of the vehicle to walk to the end on which the parking brake assembly is installed.

According to yet another example, the manually operable release device 200 may include a two-position, three-port valve 220, shown in FIG. 11. An auxiliary reservoir 222 of the fluid pressure may be connected at one port thereof to the brake pipe through a check valve 224 and a restricting choke 226 mounted in series with the check valve and connected at another port thereof to the valve 220.

Another device for operating the valve 210 or 220 may restore the fluid pressure to the pneumatically operated cylinder 160. By way of an example shown in FIG. 12, a three-way valve 230 may be provided, with the pushbutton 214 replaced with a solenoid 232. The valve 210 can be operable in the second position for allowing flow of the fluid pressure through the valve 210 by an electrical signal communicated to the solenoid. This signal can be remotely communicated (e.g., transmitted and/or broadcast), such as from the vehicle, by one or more of wires, radio frequency, satellite communicating, and like methods. This can allow for remote release of the applied parking brake assembly 60. The valve 230 may be adapted with a second solenoid 234 to remotely operate such valve 230 into the position for enabling flow of the fluid pressure to the cylinder 160 and, more particularly, allowing remote application of the parking brake assembly 60.

The example also contemplates to provide either valve 210, 220, or 230 in combination with the release shaft 202 of FIG. 11. For example, a manually operable valve 210 or 220 is mounted in close proximity to the end or the side of the vehicle, enabling the operator of the vehicle to operate the parking brake assembly 60 from one side of the vehicle without the need to reach underneath the vehicle and into the confines of the truck apparatus 3. The above-described manual release devices 200 can be pneumatic devices that operate using fluid pressure. Other suitable release devices may be mechanical release devices. Mechanical-type devices may not depend on presence or absence of the fluid pressure in the brake pipe to release applied brakes. Such a mechanical manual release device 250 can be used in combination with the brake rigging installed within the truck apparatus carrying one end of the vehicle body. As described above, the truck apparatus may include the frame 5 having the pair of side members 6a and 6b joined by the bolster 7.

With reference to FIGS. 2-7, the manual release device 250 may include a first plate-like member 252 in abutted engagement to an inner vertical surface portion of one side member 6a of the truck apparatus 3. A first plurality of apertures 254 is formed through the first plate-like member 252 and is disposed in a predetermined pattern. A second plate-like member 256 is in abutted engagement to an outer vertical surface portion of the side member 6a. A second plurality of apertures 254 is formed through the second plate-like member and is disposed in the same predetermined pattern as the apertures 254 formed through the first plate-like member 252. Each of the apertures 254 in the second plurality is aligned with a respective one of the apertures 254 in the first plurality. A plurality of rods 260 is provided with each of the passed-through aligned apertures 254 in the first and second plate-like members, respectively. A male thread 262 is formed on each end of each rod 260. A plurality of threaded fasteners 264 is used, with each fastener 264 operably engaging a respective rod end for affixing the first and second plate-like members, respectively, about the side member 6a by caging a portion thereof between the plate-like members.

An elongated slot 270 is formed though the first plate-like member and extends in a generally horizontal direction. An L-shaped slot 272 is formed in the second plate-like member 256 and has a horizontal leg 274 thereof aligned with the elongated slot 270 formed through the first plate-like member 252. The L-shaped slot 272 also has a vertical leg 276.

An elongated link member 280 is provided and has a predetermined shape for routing through the truck apparatus. The first end 282 of the link member passes through the elongated slot 270 and through the L-shaped slot 272 and extends outwardly from the second plate-like member. A second end 284 of the link member 280 is coupled to the parking brake assembly 60. A grip member 286 is disposed on and secured to the first end 282 of the elongated link member 280. This grip member is manually operable to move the link member 280 from a first position enabling application of the parking brake assembly 60 into a second position enabling release of an applied parking brake assembly 60. The grip member 286 may be shaped as a handle and may be provided integral with the link member 280 by bending the second end 284 thereof. A biasing element (e.g., a spring) is provided and is engaged with the elongated link member 280 for returning the link member 280 into the first position upon release of the grip member 286.

Figure 6:
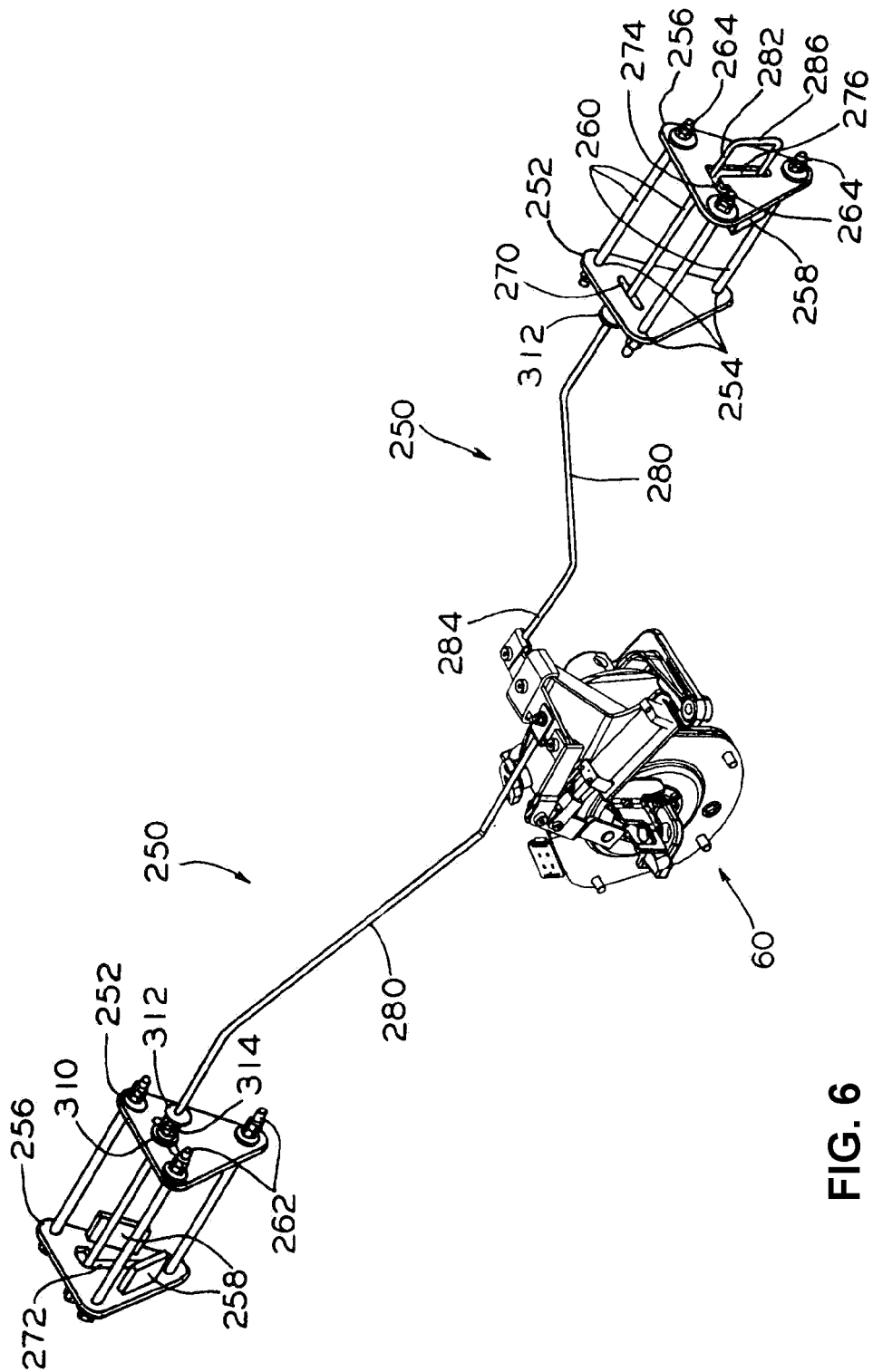
FIG. 6 is an isolation perspective view of the parking brake assembly shown in FIG. 1.

The mechanical arrangement for connecting the second end 284 of the elongated link member 280 to the parking brake assembly 60 may include first release lever 290 that is pivotally connected to the mounting bracket 150. By way of the example shown in FIGS. 6 and 7, this pivot connection may be achieved with a pin or fastener 292 passed through aligned apertures in the first release lever 290 and the mounting bracket 150. There is also a pivot connection that pivotally connects the second end 284 of the elongated link 280 to one end of the first release lever 290. As shown in FIGS. 6 and 7, the second end 284 may be formed as a bifurcated portion with an aperture formed therethrough and aligned with another aperture formed through the first release lever 290. A pin or fastener 294 passes through these aligned apertures. There is also a second release lever 300 having a first end 302 thereof pivotally connected to a second end of the first release lever 290 and having a second end 304 thereof pivotally connected to the second end 134 of the operating lever 130.

In operation, manually initiated movement of the elongated link 280 from the first position toward the second position causes rotational movement of the operating lever 130 in the second rotational direction due to rotation of each of the first and second release levers 290 and 300, respectively. This enables the holding pawl 128 to disengage the ratchet teeth and enable the push rod 30 to move in the second direction due to extension of the spring 100, thus releasing the applied braking force. During manual release of the brakes, the grip member 286 is movable through a vertical leg 276 of the L-shaped slot 272. The manual release mechanism 250 may include a pair of spacers 258 rigidly secured to an inner surface of the second plate-like member 256 for positioning the mechanism 250 in a spaced relationship with the outer surface of the side member 6a and for enabling movement of the grip member 286 through the vertical leg 276 of the L-shaped slot 272.

The horizontally disposed leg 274 enables the operator of the vehicle 2 to move the grip member 286 through the vertical leg 276 sufficiently to clear the outer surface of the second plate-like member 256 and then move the grip member 286 laterally along the first leg 274 to latch such grip member 286 against the outer surface of the second plate-like member 256. This can prevent the elongated link 280 from returning into the first position and can prevent the holding pawl 128 from reengaging the ratchet 114. Thus, the vehicle can be freely moved. When required, the user laterally moves the grip member 286 in the opposite direction so the grip member 286 can move through the vertical leg 276. This allows the link member 280 to return to the first position due to the action of the biasing device. It is also possible to angle the leg 274 downwardly to facilitate retention of the grip member 286.

With reference to FIG. 7, the biasing device may be formed by a first washer 310 movably secured to the elongated link member 280, a second washer 312 rigidly secured to the elongated link member 280 in spaced relationship with the first washer 310, and a spring 314 caged between the first washer 310 and the second washer 312. The spring 314 can be compressed during movement of the elongated link member 280 into the second position and can extend when the manual movement is discontinued and the link member 280 is unlatched, thus returning the link member 280 to the first position. The manual release mechanism 250 enables the operator of the vehicle to release the applied parking brake assembly 60 from one side of the vehicle without the need to reach underneath thereof and into the confines of the truck apparatus. A second manual release mechanism 250 may be provided and operable from the other side of the vehicle, as shown in FIGS. 2-4 and FIG. 7.

Figure 13:
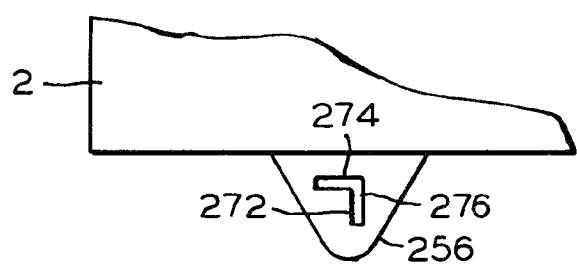
FIG. 13 is a side view of a mechanically operated manual release assembly, illustrated in FIG. 6, and connected to the side of the vehicle body shown in FIG. 3.

Although the manual release mechanism 250 has been shown and described in terms of the parking brake assembly 60 being used with a truck-mounted brake system, the manual release mechanism 250 may be applied with the parking brake assembly being used with a car body mounted brake system. This may be accomplished by securing the second plate-like member 256 to the side of the vehicle body and connecting the first end 282 of the elongated member 280 to the second plate-like member 256, as shown in FIG. 13.

Figure 8:
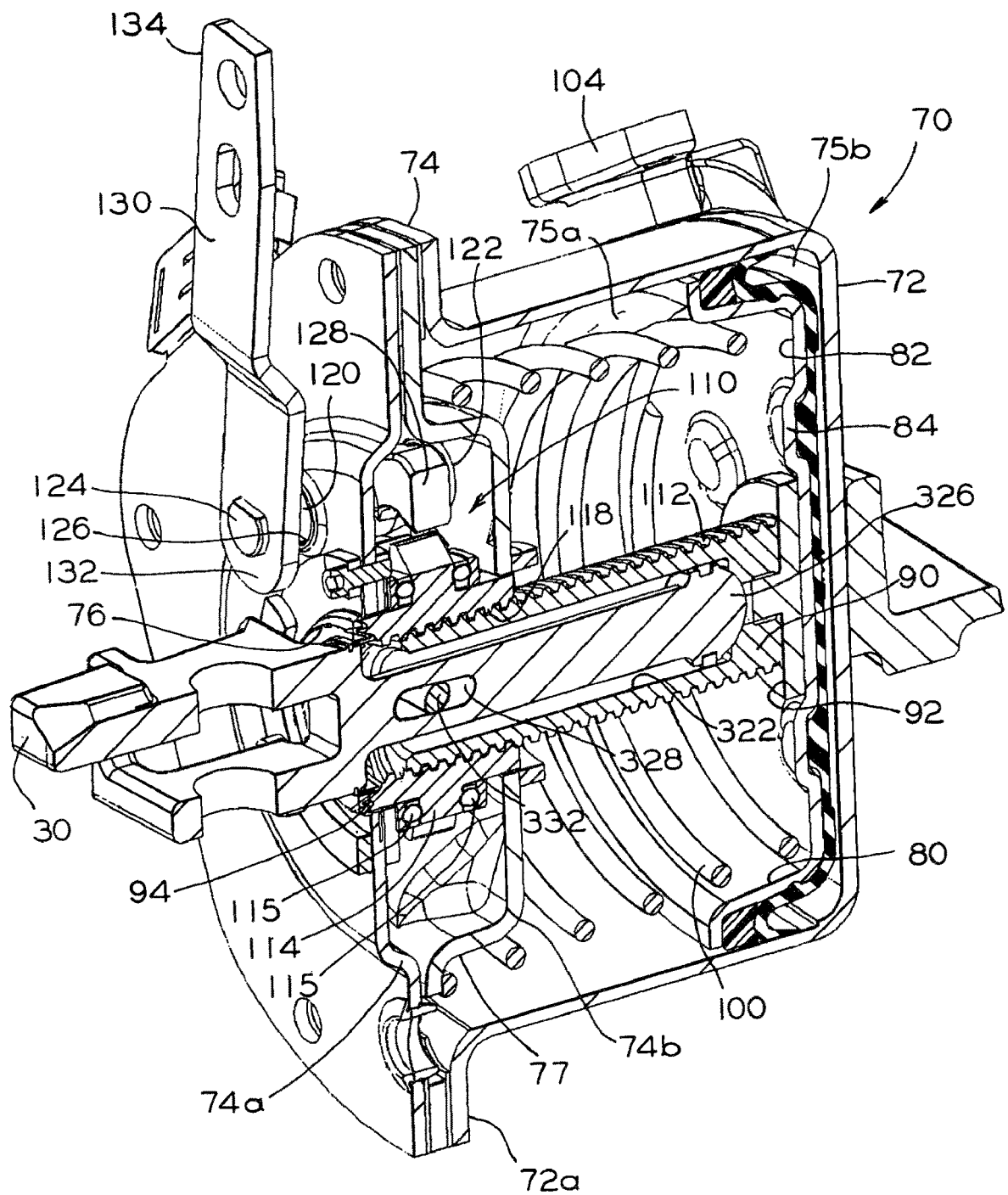
FIG. 8 is a cross-sectional view of the brake actuator taken along lines VIII-VIII in FIG. 7.
Figure 9:
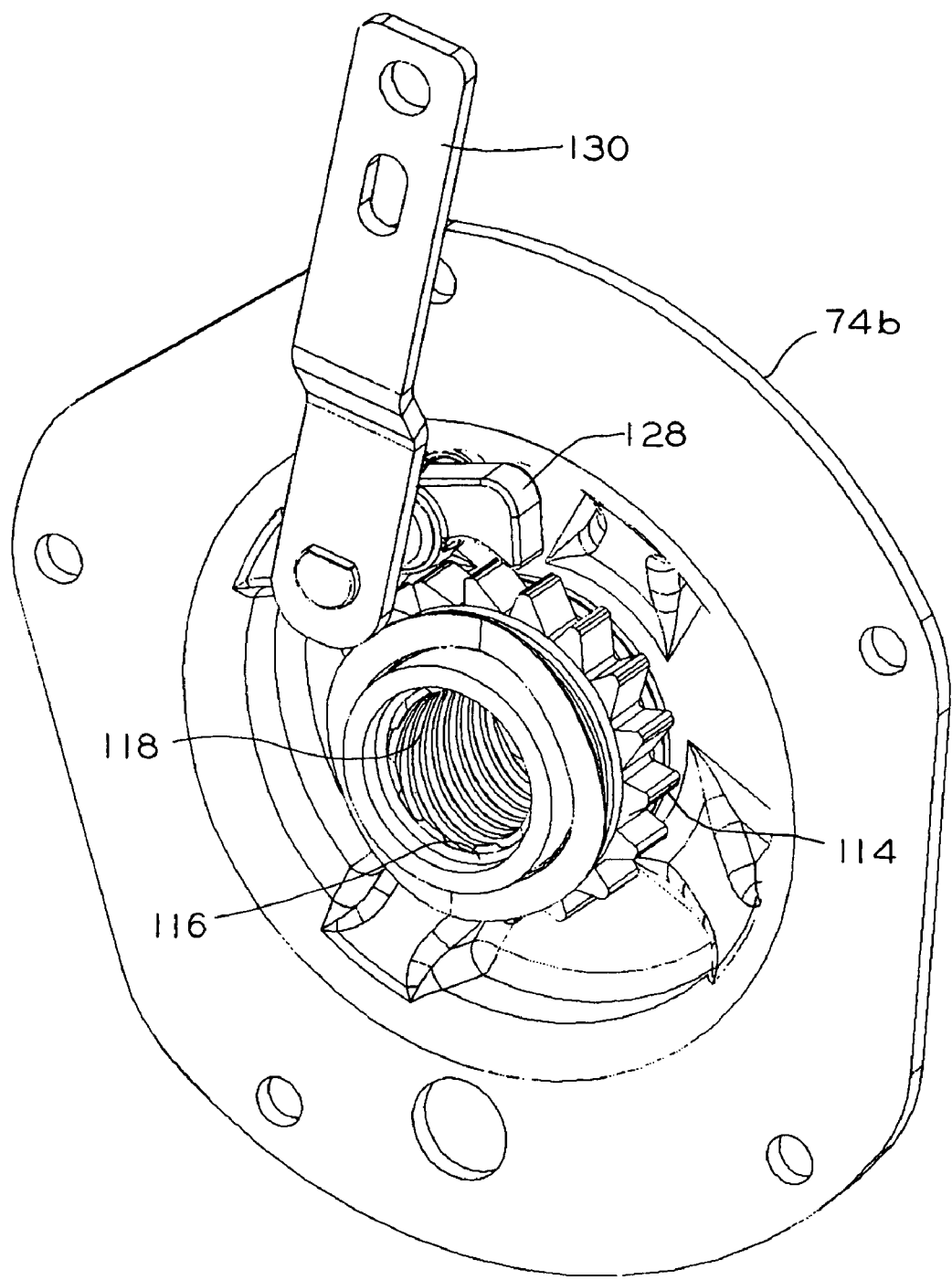
FIG. 9 is a partial perspective view of the brake actuator of FIG. 7.
Figure 10:
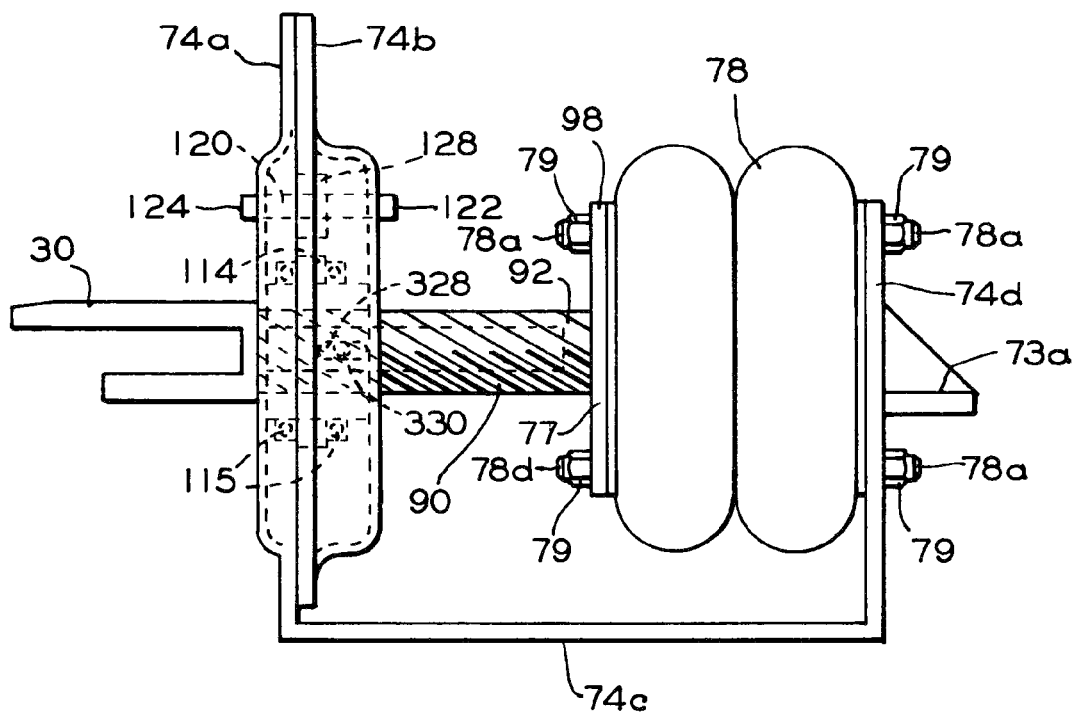
FIG. 10 is a side view of the brake actuator employed within a parking brake assembly.

According to an example, means for compensating for bail of the push rod 30 moving laterally during the rotation of the force-transfer lever 24 and, at the same time, preventing rotation of the piston rod 90 during longitudinal movement may be provided. With reference to FIGS. 8 and 10, such means includes an axial cavity 322 formed within the piston rod 90 and defining a peripheral wall of the piston rod 90. An aperture is formed through the peripheral wall. An elongated abutment 326 is disposed on and secured to the push rod 30 and is positioned within the axial cavity 322. A slot 328 is formed through the abutment 326 in alignment with the aperture 330 formed through the peripheral wall of the piston rod 90. An elongated pin 332 is passed through a combination of the slot 328 and the aperture 330 formed through the peripheral wall of the piston rod 90. This may be done frictionally. The placement may allow for axial movement of the push rod 30 while preventing rotational movement of the piston rod 90.

The device compensates for bail of the push rod 30 moving laterally during the rotation of the force-transfer lever 24 and, at the same time, preventing rotation of the piston rod 90 during longitudinal movement. Now in reference to FIG. 8, such means may include an axial cavity 322 formed within the piston rod 90 and defining a peripheral wall of the piston rod 90. An aperture is formed through the peripheral wall. An elongated abutment 326 is disposed on and secured to the push rod 30 and is positioned within the axial cavity 322. A slot 328 is formed through the abutment 326 in alignment with the aperture 330 formed through the peripheral wall of the piston rod 90. An elongated pin 332 is frictionally passed through a combination of the slot 328 and the aperture 330 formed through the peripheral wall of the piston rod 90, allowing for axial movement of the push rod 30 while preventing rotational movement of the piston rod 90.

With reference to FIGS. 14 through 21, specific examples of the inventive subject matter are provided and discussed below that are suitable for use with vehicle brake systems. In one embodiment, these are suitable for use in connection with parking brake assemblies and brake actuators of the type described above with reference to FIGS. 1 through 13.

Figure 14:
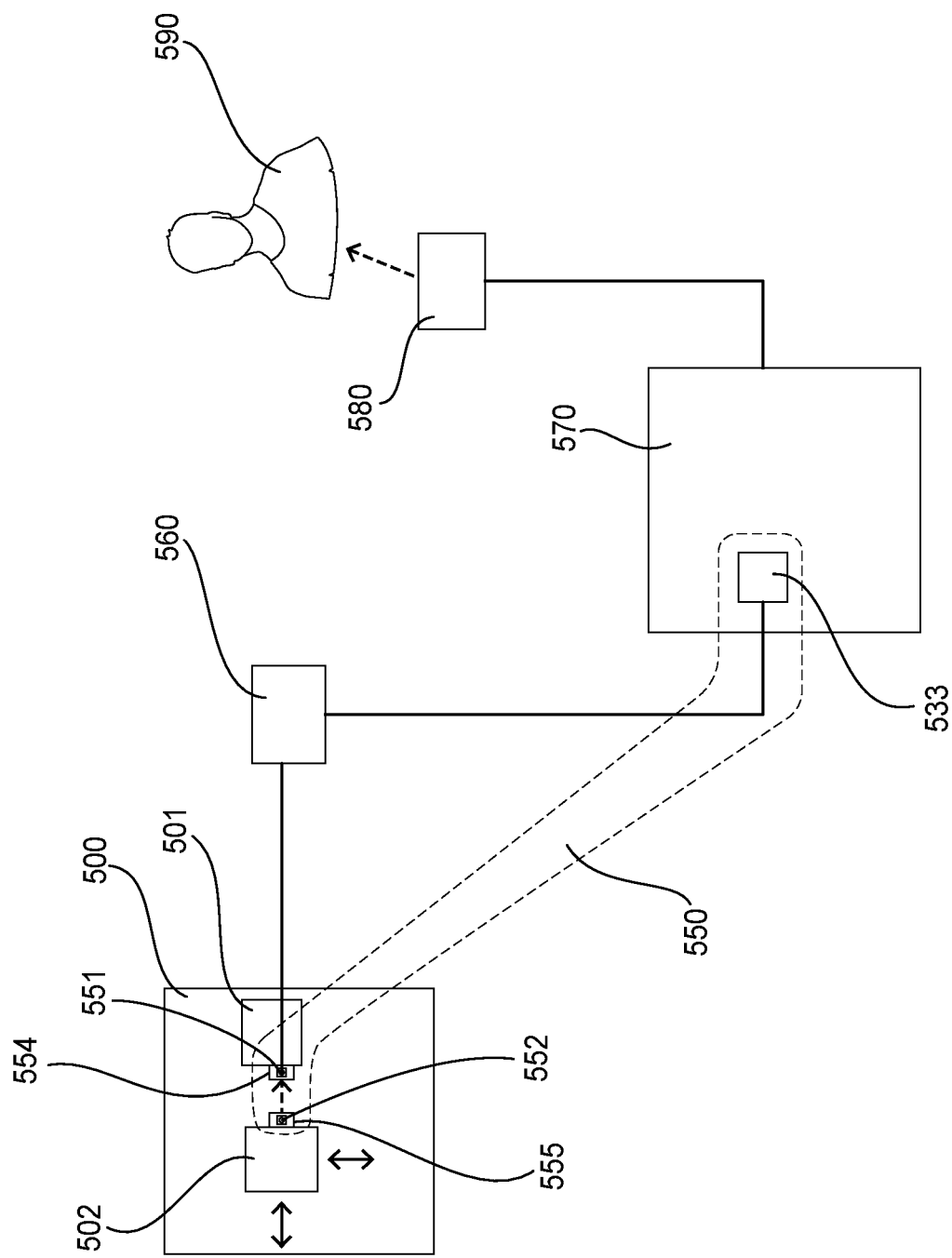
FIG. 14 is a schematic block diagram of a vehicle brake system, vehicle control system, and detection device according to an example.

With reference to FIG. 14, a status detector 550 or status detector device for detecting a status of a vehicle brake system or assembly 500 is shown in accordance with one example. The detector may include a sensor 551 that may be disposed on a first component 501 of the vehicle brake system 500 and a sensor trigger 552 that may be disposed on a second component 502 of the vehicle brake system that is movable with respect to the first component 501. The device may include a controller 553 in communication with the sensor. The sensor may detect a proximity of the sensor trigger with respect to the sensor, and the controller may determine the status or mode of the vehicle brake system based at least in part on the detected proximity of the sensor trigger with respect to the sensor. For example, the status or mode may be open or closed, near or far, engaged or not engaged, on or off, up or down, and the like. In one embodiment, the status or mode may be selected from a range (rather than as a binary option). In such a range, for example, the first component may be in an "full open" mode, with the sensor and the sensor trigger very far apart (and thus having a weaker detected signal), or in a "fully engaged" mode with the sensor trigger as close to the sensor as possible, or in a "partially engaged" mode with the sensor trigger being disposed a distance from the sensor that is an intermediate distance relative to full open or fully engaged.

As shown in FIG. 14, the first component of the vehicle brake system may be stationary or fixed within the vehicle brake system or to the vehicle itself. Optionally, the first component may be movably disposed on the vehicle or with respect to the vehicle brake system. The second component is disposed within the vehicle brake system such that the second component moves with respect to the first component in a reciprocating manner (e.g., toward and away) and/or is movable past the first component in any one of or in a combination of lateral, longitudinal, and vertical directions. According to one example, the second component is movably mounted on or connected to the first component so as to reciprocate on or with respect to the first component.

Actuation of the vehicle brake system to apply or release the vehicle brakes causes the first component to move with respect to the second component. The relative position of the second component with respect to the first component can be indicative of the status of the vehicle brake system. For example, the relative position of the second component to the first component can indicate whether the vehicle brake system has been actuated to apply the vehicle brakes or to release the vehicle brakes and also with respect to whether the second component and/or the first component are positioned and operating correctly within the vehicle brake system.

The device provides instrumentation for directly or indirectly measuring the spatial relationship and movement of the second component with respect to the first component within the vehicle brake system, to determine the status of the vehicle brake system based on that measurement, and then to possibly communicate the determined status to a vehicle operator 590 or a remote monitor.

According to one example, the sensor of the detector may include a proximity sensor that detects the proximity of the sensor trigger with respect to the sensor by detecting the presence of the sensor trigger within a certain spatial range from the sensor and/or by measuring a distance from the sensor to the sensor trigger. The sensor may communicate the detected proximity of the sensor trigger to the controller to determine the status of the vehicle brake system.

The sensor may include a magnetic sensor and the sensor trigger may include a magnet. The sensor magnetically detects the presence of the sensor trigger. The detection may take place within a determined range from the sensor (based, for example, on a level of detected magnetic flux being above a threshold value). For instance, when the vehicle brake system is actuated to apply the vehicle brakes, the second component may be moved toward the first component such that the sensor trigger is moved within a range to be magnetically detected by the sensor, which then communicates the detected proximity of the sensor trigger to the controller. Conversely, when the vehicle brake system is actuated to release the vehicle brakes, the second component may be moved away from the first component such that the sensor trigger is moved out of the range to be magnetically detected by the sensor, which then communicates the lack of detected proximity of the sensor trigger to the controller.

Other suitable sensors may be proximity sensors, such as a capacitive sensor, an inductive sensor, a Doppler sensor, an optical/light-based sensor, an infrared/heat-based sensor, a radio sensor, an ultrasonic sensor, a Hall effect sensor, and/or a piezo-electric/contact-based sensor. The sensor trigger may be selected based at least in part on the type of selected sensor. The sensor trigger may include a proximity sensor that may detect graduations of proximity such that complementary proximity measurements may be communicated to the controller.

The controller may determine an application status of the vehicle brake system based on the detected proximity of the sensor trigger with respect to the sensor. The controller may determine an operational status of the vehicle brake system based on the detected proximity of the sensor trigger with respect to the sensor.

The application status determined by the controller may assess whether the vehicle brake system has been actuated to apply the vehicle brakes during normal operation of the vehicle via the pneumatic, hydraulic, and/or electric actuators of the vehicle brake system in communication with the vehicle controls. The application status determined by the controller may assess whether a hand or manually actuated brake assembly (e.g., a parking or emergency brake assembly) has been operated by the vehicle operator 590 and/or by maintenance personnel to actuate the vehicle brake system to apply the vehicle brakes and/or auxiliary parking or emergency brakes.

The operational status determined by the controller may assess whether the first or second components of the vehicle brake system are properly positioned within the vehicle brake system and are operating correctly (or whether the first or second components are structurally damaged or malfunctioning). In one embodiment, maintenance health of the brake assembly can be the operating status or mode. Such a determination may be based at least in part on measurements of the travel of the sensor trigger with respect to the sensor or measurements of the distance between the sensor and the sensor trigger when the vehicle brakes are applied or released. Suitable additional metrics may include the rate of change of the position of the sensor trigger relative to the sensor. Different rates or speeds of movement of the sensor trigger relative to the sensor may indicate different health states of the brake assembly. For example, faster switching of the sensor trigger from one position to another (e.g., rates of change of the positions of the sensor trigger that are faster than an upper rate change threshold) may indicate that the components are loose or worn. Slower switching of the sensor trigger from one position to another (e.g., rates of change of the positions of the sensor trigger that are slower than the upper rate change threshold but faster than a lower rate change threshold) can indicate that components of the brake assembly are well lubricated and smoothly functional. Even slower switching of the sensor trigger from one position to another may indicate rust, misaligned components, or other faults of the brake system (e.g., rates of change of the positions of the sensor trigger that are slower than the lower rate change threshold). The controller may differentiate healthy components from deficient components (and the degree to which the components may be deficient) based at least in part on the operation of the components relative to each other based on the sensor readings. Further, during operation of the vehicle, vibrations may cause the sensor signal to indicate that the components are moving relative to each other. Significant play caused by loose parts may initiate a sensed signal signature or pattern that is detectable by the sensor (as the sensor trigger bounces back and forth near the sensor) and by which the controller may determine the operating condition or health status of the brake assembly. For example, the signature may be a repeating pattern of movements of the sensor trigger relative to the sensor (or the sensor relative to the sensor trigger) that is detected by the sensor. These movements can include small vibrations or back-and-forth movements over distances that are far shorter than the movement of the sensor trigger (or sensor) caused by application or release of the brake assembly (e.g., shorter than 5%, shorter than 3%, or shorter than 1% of the application or release distance in different embodiments). The repeated magnitudes of these shorter movements, frequency at which the shorter movements occur, the number of these shorter movements, or the like, may be a pattern or signature of the repeated movements of the sensor trigger and/or sensor. The pattern or signature may be compared to one or more thresholds associated with different operational states or health states of the brake assembly. For example, a pattern that does not exceed a threshold may indicate that the small movements of the sensor and/or sensor trigger are normal and do not indicate a fault with or need for maintenance to the brake assembly. But, a pattern that exceeds the threshold may indicate that the small movements are abnormal, indicate a fault with the brake assembly, and/or indicate a need for maintenance to the brake assembly.

As shown in FIG. 14, the detector may include a housing 554 for mounting the sensor on the first component with the sensor being disposed within the housing. The housing may include a connector for communicating the sensor readings to the controller via one or more wired connections and/or may include transceiving circuitry for wirelessly communicating the sensor readings to the controller. The device may include a carrier 555 for mounting the sensor trigger on the second component, with the sensor trigger being disposed on the carrier.

According to one example, the controller is incorporated in the vehicle control system 570 that controls operations of the vehicle based on input from the operator 590 and/or may automatically control operations of the vehicle. The connector of the housing may be connected to the vehicle communications system 560 for communicating the sensor readings to the controller. Alternatively, the sensor may wirelessly communicate with the controller. The controller may be provided completely separate from the vehicle control system or may be provided in the housing with the sensor and in communication with the vehicle control system via the vehicle wired communication system or via a wireless communication system for the vehicle.

The controller may include or represent a microcontroller including one or more processors and a memory device encoded with any software instructions that may direct operations of the processor(s). For example, these instructions may direct the processor(s) to query and receive signals from the sensor, and to utilize the detected proximity of the sensor trigger with respect to the sensor to determine the status of the vehicle brake system. The controller may communicate with a notification device 580 such that the determined status of the vehicle brake system may be communicated to the vehicle operator 590. The notification device 580 may be a main vehicle visual display, an auxiliary visual display, and/or a speaker that may deliver an audible signal or message to the vehicle operator 590. As shown in FIG. 14, the notification device 580 is in communication with the vehicle control system 570 incorporating the controller. Alternatively, the notification device 580 may be communicated with the controller independent of the vehicle control system 570.

The vehicle may be a railway vehicle, such as a railcar or locomotive, and the vehicle brake system may be a railway parking brake assembly of the type discussed above with respect to FIGS. 1-13. According to such an example, the sensor may be disposed on a stationary component of the railway parking brake assembly 60, and the sensor trigger may be disposed on a movable component of the railway parking brake assembly. The sensor may be disposed on a brake cylinder of the railway parking brake assembly and the sensor trigger may be disposed on a piston rod of the railway parking brake assembly. The detector device may be used in a vehicle having a vehicle brake system that incorporates a first component and a second component that is suitably movable with respect to the first component such that the detected proximity of the sensor trigger with respect to the sensor may be used to determine the status of the vehicle brake system, such as a locomotive, passenger railcar, rail transit vehicle, or the like. But, not all embodiments of the inventive subject matter are limited to railway vehicles. One or more embodiments may be used with other vehicles, such as an automobile, passenger vehicle, mining equipment, truck, tractor, trailer, passenger bus, agricultural equipment vehicle, or aircraft. The device may be implemented in connection with both new and existing vehicle brake systems.

With reference to FIG. 14, a method of determining a status of a vehicle brake system is provided. The method may include providing a sensor and sensor trigger. The sensor may be mounted on a first component of the vehicle brake system. The sensor trigger may be disposed on a second component of the vehicle brake system that moves or can move relative to the first component. The sensor may communicate signals with a controller, where the signals indicate relative positions of the components and/or relative movement of at least one of the components. Proximity of the sensor trigger may be detected or determined with respect to the sensor. The detected proximity may be communicated to the controller via wires and/or wireless connections. The status of the vehicle brake system may be determined based at least in part on the detected proximity of the sensor trigger with respect to the sensor, as described above. The method may include notifying the determined status of the vehicle brake system to a vehicle operator. The determined status of the vehicle brake system may be an application status of the vehicle brake system and/or an operating status of the vehicle brake system.

With reference to FIGS. 15 through 21, a brake actuator 625 for use in connection with a parking brake assembly 60 of the type discussed above with reference to FIGS. 1 through 13 is shown in accordance with one example of the inventive subject matter. Alternatively, the brake actuator may be used with another type of brake assembly. According to the example, the brake actuator 625 incorporates a first stationary assembly component 600 of the railway parking brake assembly and a second moveable assembly component 602 of the railway parking brake assembly. The second assembly component 602 is movable with respect to the first assembly component 600. The parking brake assembly also may include a detector device for determining a status of the parking brake assembly. The device may include a sensor trigger 623 disposed on the second assembly component and a sensor 614 disposed on the first assembly component 600. Alternatively, the trigger may be disposed on the stationary component and the sensor may be disposed on the moveable component. Optionally, each of the stationary component and the moveable component can include a sensor and a sensor trigger, with the sensor on one component configured to detect the proximity of the sensor trigger on the other component but not the sensor trigger on the same component. This type of arrangement can be used to provide redundant sensor measurements. The sensor 614 may be detect a proximity of the sensor trigger 623 with respect to the sensor 614, as discussed above with respect to the sensor and sensor trigger shown in FIG. 14. The detector device may include a controller 626 that is in communication with the sensor 614 and may determine a status of the parking brake assembly 60 based on the detected proximity of the sensor trigger 623 with respect to the sensor 614, as discussed above with respect to the controller shown in FIG. 14.

The controller 626 may determine an application status of the parking brake assembly based on the detected proximity of the sensor trigger 623 with respect to the sensor 614. The controller 626 may determine an operating status of the parking brake assembly based on the detected proximity of the sensor trigger 623 with respect to the sensor 614. The device may include a housing 610 for mounting the sensor 614 on the first assembly component 600. The sensor 614 can be disposed within the housing 610 and a carrier 622 for mounting the sensor trigger 623 on the second assembly component 602.

Figure 15:
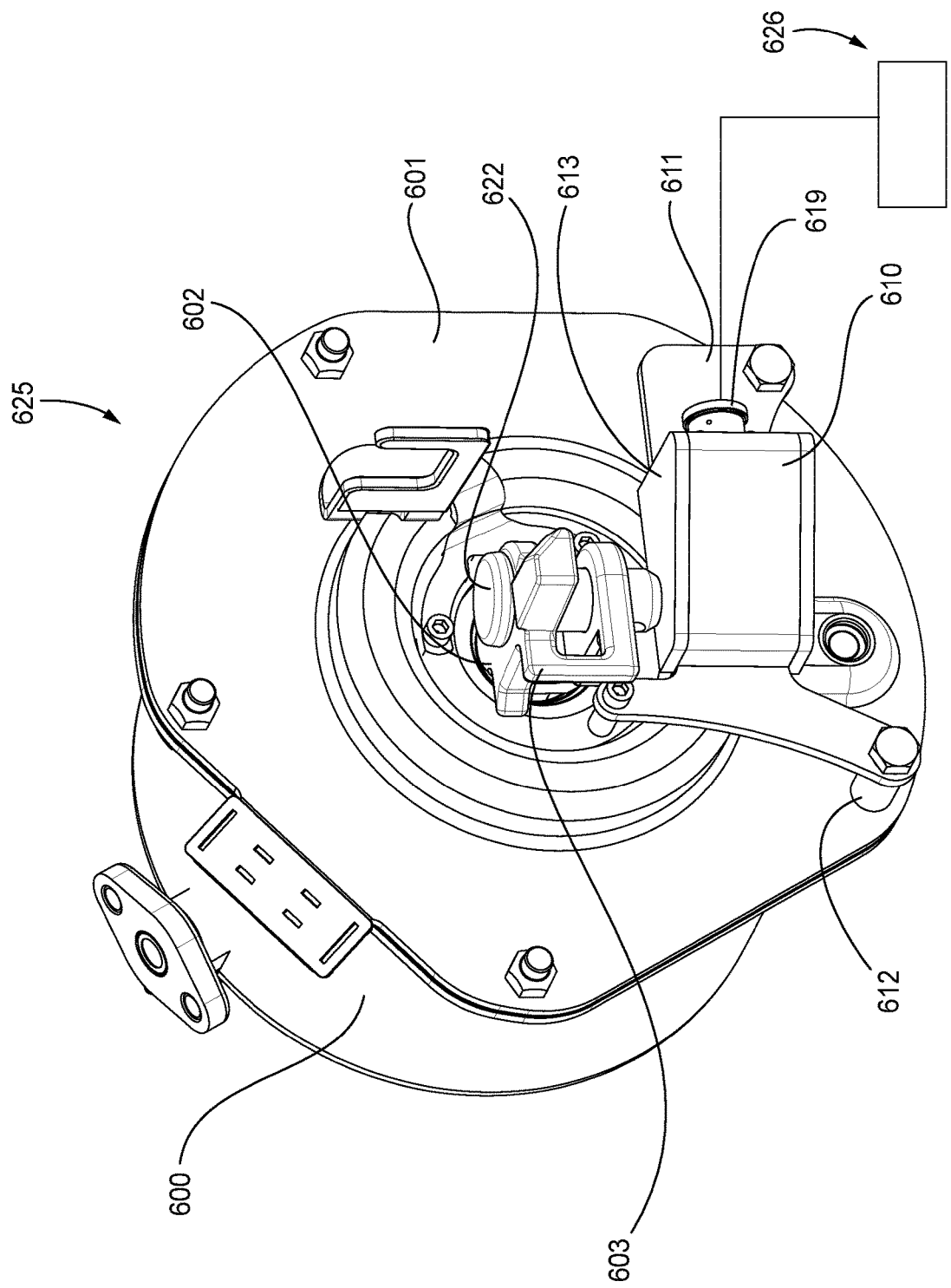
FIG. 15 is a perspective view of a brake actuator employed within a parking brake assembly incorporating components of a detection device according to an example, with the piston rod in a retracted position.
Figure 16:
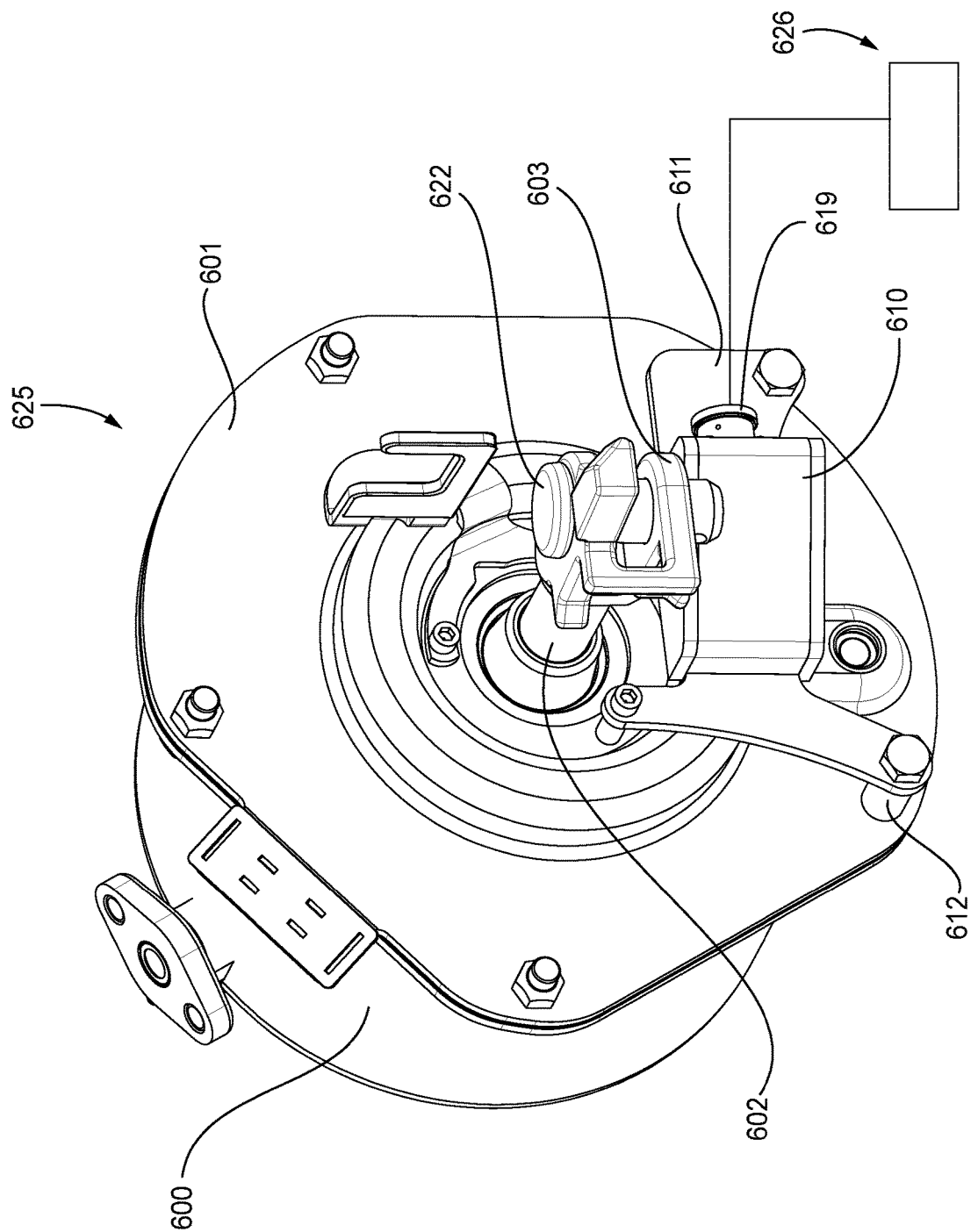
FIG. 16 is a perspective view of the brake actuator shown in FIG. 15, with the piston rod in an extended position.
Figure 17:
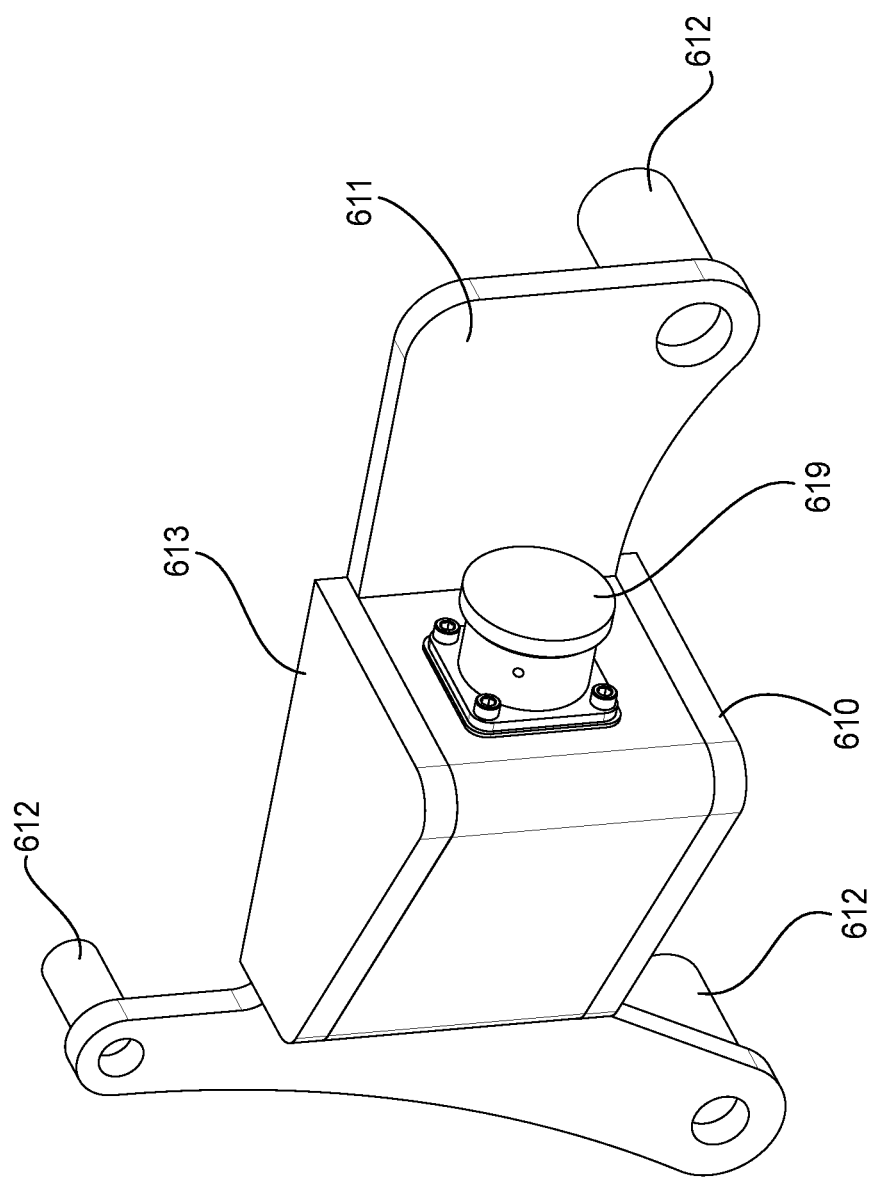
FIG. 17 is a perspective view of a housing for a sensor of a detection device according to an example.

As shown in FIGS. 15 and 16, the first assembly component 600 may include a brake cylinder 600 of the brake actuator 625 and the second assembly component 602 may include a piston rod 602 of the brake actuator 625 extensibly disposed on the brake cylinder. When the parking brake assembly is in the released state shown in FIG. 15, the piston rod is retracted with respect to the brake cylinder. The sensor trigger disposed on the carrier (shown in FIGS. 20 and 21) is positioned in close proximity to the sensor disposed in the sensor housing 610 (shown in FIGS. 18 and 19) such that the sensor communicates the close proximity of the sensor trigger to the controller. When the parking brake assembly is actuated to apply the brakes (as shown in FIG. 16), either during a pneumatic brake application or via the hand brake mechanism discussed above with reference to FIGS. 1 through 13, the piston rod becomes extended from the brake cylinder. The sensor trigger disposed on the carrier is moved away from the sensor disposed in the housing such that the sensor communicates the distant proximity and/or lack of proximity of the sensor trigger to the controller. Based on the detected proximity of the sensor trigger with respect to the sensor, the controller may determine the status of the brake actuator and/or the railway parking brake assembly. Optionally, the sensor trigger can be disposed on the brake cylinder and the sensor can be disposed on the piston rod.

With reference to FIGS. 15 through 19, the detector device further may include the housing 610 (e.g., a sealed enclosure) and a mounting plate 611 for mounting the sensor 614 on a non-pressure head 601 of the brake cylinder 600. The sensor 614 can be disposed within the housing 610. The housing 610 may include a connector 616 on one side thereof for communicating the sensor 614 to the controller 626. For example, the connector 616 can conductively couple wires, buses, cables, or the like, to permit the sensor to communicate with the controller.

Figure 18:
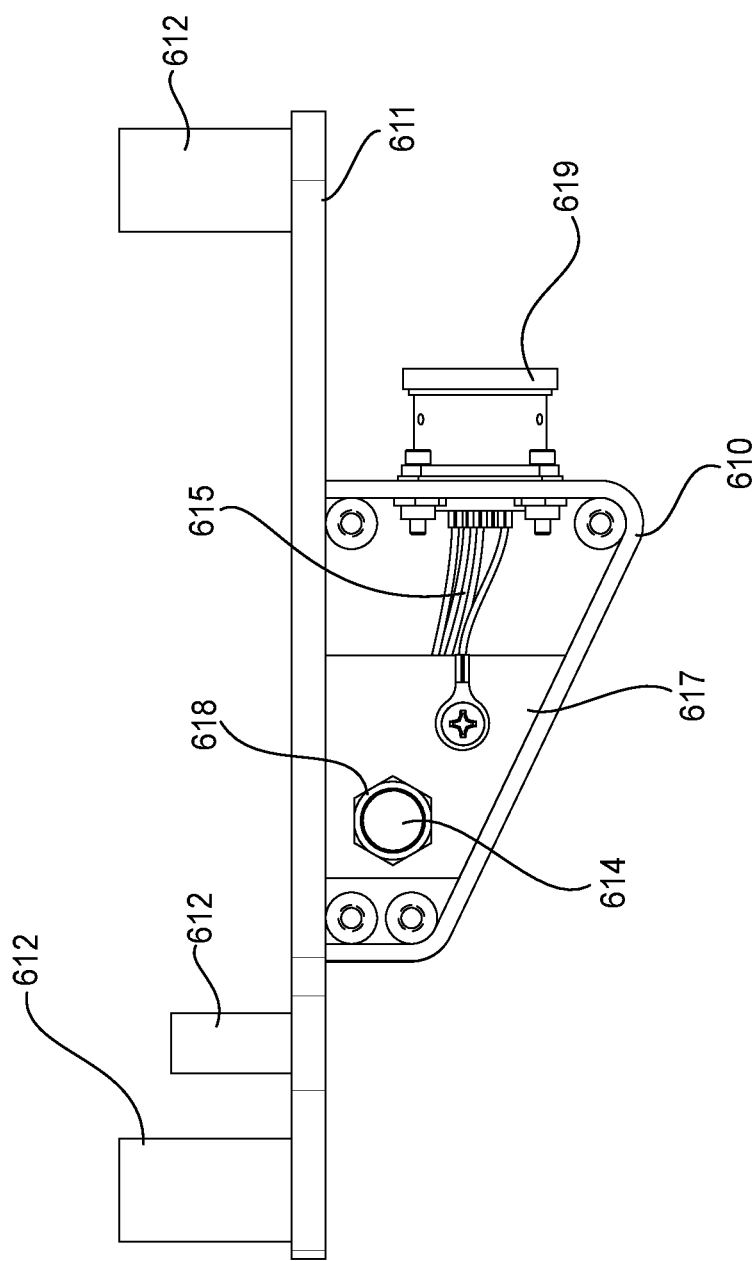
FIG. 18 is a top view of the housing shown in FIG. 17 with a top plate of the housing removed to view the sensor.
Figure 19:
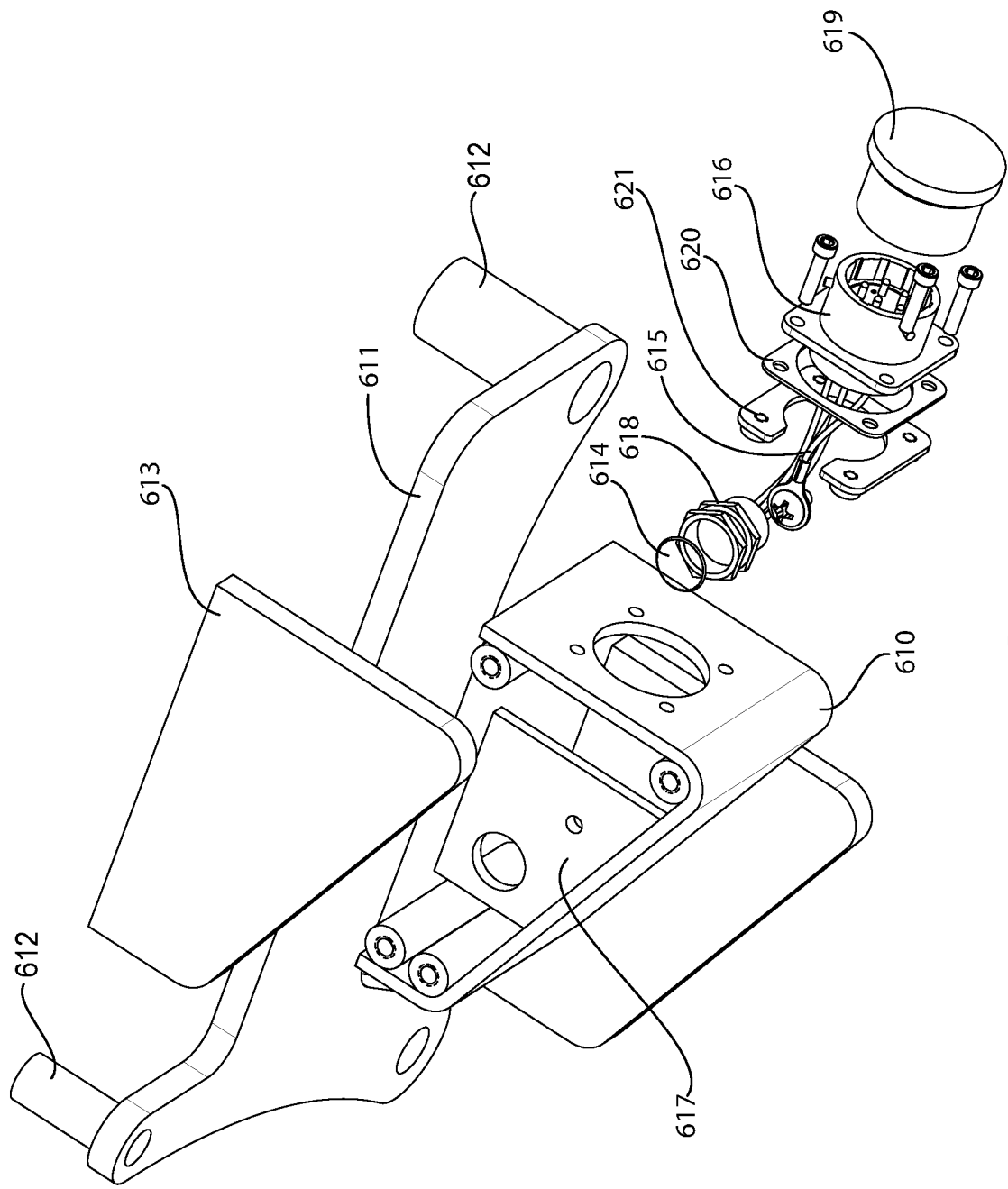
FIG. 19 is an exploded perspective view of the housing and the sensor shown in FIGS. 17 and 18.
Figure 20:
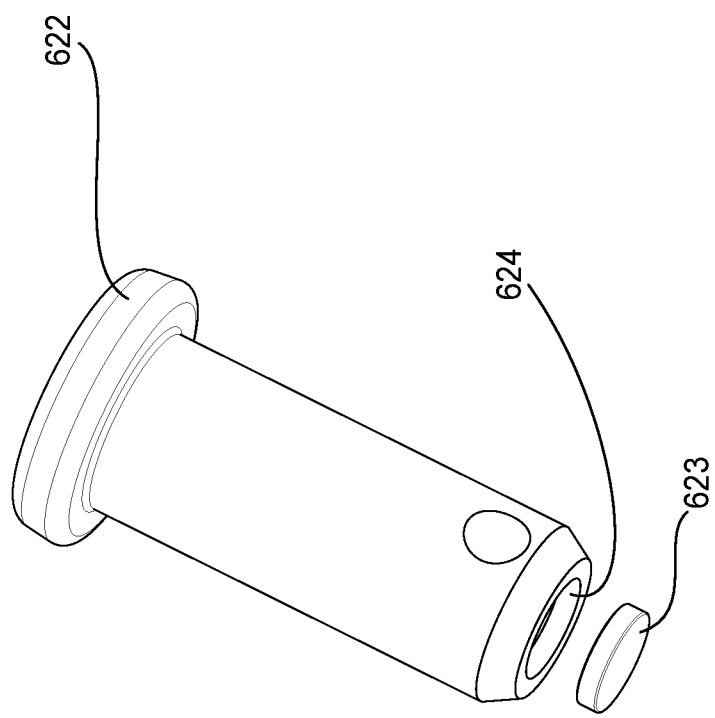
FIG. 20 is an exploded perspective view of a carrier and sensor trigger according to an example.
Figure 21:
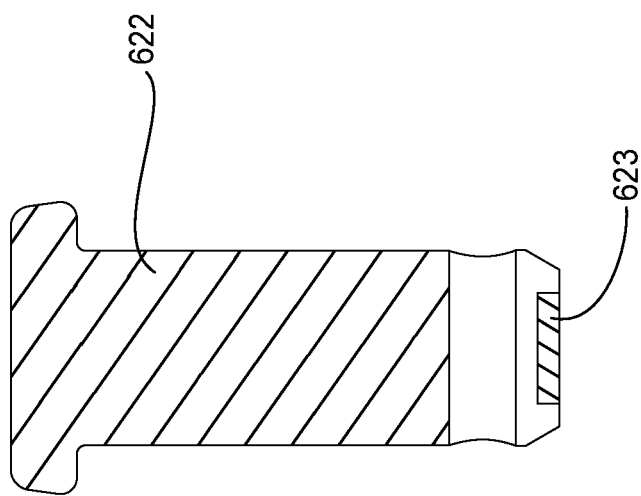
FIG. 21 is a cross-sectional view of the carrier and sensor trigger shown in FIG. 20.

One or more standoffs 612 may be provided for fastening the mounting plate 611 to the non-pressure head 601 at existing holes defined in the non-pressure head 601. As shown in FIGS. 18 and 19, the housing 610 defines an enclosure containing the sensor 614. The housing 610 may include a top cover plate 613 removably fastened to the housing 610 to allow for access to the sensor 614 and other internal components of the housing 610. The connection of the cover plate 613 to the housing 610 may be sealed. The sensor 614 may be fastened by a mounting nut 618 to an internal mounting plate 617 within the housing 610 below the cover plate 613. The housing 610 may also include a wiring harness 615 that connects the sensor 614 to the connector 616. The connector 616 may be fastened to the side of the housing 610 by a plurality of fasteners extending through a sealing member 620 and nut plate 621 positioned between the connector 616 and the outer surface of the housing 610. A connector cover 619 may be disposed over the connector 616 prior to and during installation of the housing 610 in order to enclose and protect the connector 616.

With reference to FIGS. 15, 16, 20, and 21, the device may include the carrier 622 for mounting the sensor trigger 623 on the piston rod 602. The carrier 622 may be provided in the form of a carrier pin 622 may be inserted through a clevis 603 of the piston rod 602. The carrier pin 622 may include a recess 624 in an end thereof in which the sensor trigger 623 can be disposed. According to an example of the disclosure, the carrier pin 622 may also serve as a brake pin for connecting a hand brake lever, as discussed above with reference to FIGS. 1 through 13, to the clevis of the piston rod 602. According to one example, the sensor 614 is a magnetic sensor and the sensor trigger 623 is a magnet disposed on the carrier pin 622.

As discussed above with reference to FIG. 14, according to one example, the sensor may be placed in communication with the controller by a wired or wireless communication system of the vehicle, such as a train line electronics system of a railway vehicle. The controller may be incorporated in the Electronic Controlled Pneumatics (ECP) System of a railway vehicle. The controller can communicate with a notification device of the railway vehicle such that the determined status of the brake actuator and/or the railway parking brake assembly can be communicated to an operator of the railway vehicle. The connector on the housing may be provided to establish a hard-wired or other conductive connection between the sensor and the train line electronics system. According to one example, the sensor 614 and sensor trigger may be implemented on both new and existing railway parking brake assemblies, and the controller may be implemented within both new and existing ECP Systems of a railway vehicle. For example, the detector device described herein may be retrofitted to an existing brake apparatus of a vehicle or may be included in a newly manufactured brake apparatus. The controller may be provided separately of the ECP System, as discussed above with reference to FIG. 14. For instance, the controller may be provided in combination with the sensor and then able to communicate a signal to the ECP System regarding the determined status of the railway parking brake assembly.

According to the above example of FIGS. 15 through 21, the detector device can be implemented in connection with the brake cylinder and piston rod 602 of the brake actuator 625 such that the status of the railway parking brake assembly may be determined according to the proximity of the sensor trigger 623 with respect to the sensor, which is representative of the position of the piston rod on the brake cylinder. The device may be implemented with respect to other relatively movable components of the parking brake assembly discussed above with reference to FIGS. 1 through 13. The above-described device may be implemented in connection with both new and existing railway parking brake assemblies. Optionally, the detector device may be used for another type of brake apparatus, such as a parking brake of a vehicle, a brake pedal of a vehicle, or the like.

According to one example, the detector device discussed above with reference to FIGS. 15 through 21 is suitable for detecting whether the hand brake of the parking brake assembly is applied or released. The detector device can use the sensor and the sensor trigger indirectly connected to the brake rigging of the railway parking brake assembly. Railway hand brakes, when applied and released, cause movement of the brake rigging to apply braking force to the wheels, such as by removing slack from a chain connected to a manually operable wheel. This actuates a lever connected to the piston rod of a brake actuator.

By providing the sensor in relation to the movable sensor trigger, indirectly connected to the mechanism of the hand brake, the status of the hand brake as applied or released can be remotely determined by the controller. The device allows the movement of the brake rigging when actuated by the hand brake to be captured by instrumenting one of the moving parts of the railway parking brake assembly, such as the piston rod, with the sensor trigger that activates the sensor disposed in a relatively fixed position within the railway parking brake assembly, such as on the brake cylinder. The proximity of the sensor trigger detected by the sensor may then be transmitted to the controller, which indicates whether the hand brake is released, and the railway vehicle is ready to move. Conversely, if the controller determines that the hand brake is applied based on detected proximity and/or lack of proximity of the sensor trigger with respect to the sensor, then the controller will indicate that the hand brake is applied, and that the railway vehicle is not ready to move.

According to one example, the detector device described above with reference to FIGS. 15 through 21 may be used to detect the status of a railway parking brake assembly with respect to a determination of whether the manual hand brake mechanism is applied or released. As the hand brake mechanism is actuated, the slack in the chain between the hand wheel and the brake lever is taken up so that the chain pulls on the brake lever. The brake lever, in turn, pulls on the carrier pin positioned in the clevis of the piston rod to actuate the railway parking brake assembly to apply the brakes to the wheels to secure the railway car in place. The sensor disposed within the housing fixed on the brake cylinder detects the proximity of the sensor trigger disposed on the carrier pin with respect to the sensor. Movement of the carrier pin with the piston rod causes the sensor trigger to move away from the sensor, resulting in a change in the detected proximity between the sensor trigger and the sensor. The sensor transmits detected proximity and/or lack of proximity of the sensor trigger to the controller, which sends a signal indicating that the hand brake mechanism is applied or released. The controller is connected to and/or incorporated within the ECP system of the railway vehicle. The signal sent from the controller is read by the ECP system and is displayed or notified to the engineer or operator so that the engineer or operator is aware of the applied or released status of the hand brake mechanism of the railway parking brake assembly associated with one or more railway cars of the vehicle.

According to one example, the detector device may be used to detect the status of a parking brake assembly with respect to a determination of whether the pneumatic brakes are applied or released. As air is directed into the brake cylinder, the piston rod (with the carrier pin and the sensor trigger disposed on the piston rod) is extended from the brake cylinder to actuate the parking brake assembly and apply the brakes to the wheels to slow and/or secure the vehicle in place. The sensor disposed within the housing 610 fixed on the brake cylinder detects the proximity of the sensor trigger on the carrier pin with respect to the sensor. Movement of the carrier pin with the piston rod causes the sensor trigger to move away from the sensor, resulting in a change in the detected proximity between the sensor trigger and the sensor. The sensor communicates the detected proximity and/or lack of proximity of the sensor trigger to the controller, which sends a signal indicating that the brakes are applied or released. The controller can be connected to and/or incorporated within the ECP system of a railway vehicle, as described herein. The signal sent from the controller can be used by the ECP system and may be displayed or otherwise used to notify the engineer or operator of the vehicle so that the engineer or operator is aware of the applied or released status of the brakes of the parking brake assembly associated with one or more vehicles in a vehicle system (e.g., a rail vehicle system or train, or another type of vehicle system formed from two or more vehicles).

According to one example, the detector device may be used to detect the status of a parking brake assembly to determine whether the components of the parking brake assembly are operating correctly and are not damaged or malfunctioning. For instance, the detected proximity of the sensor trigger to the sensor can be used to determine whether the brake actuator is correctly positioned and/or functioning within the proper operating range. Alternatively, the detected proximity may be used to determine whether the slack adjuster is working properly by assessing whether the brake cylinder travel is correct. If the relative position (e.g., proximity, or distance between the trigger and the sensor) is within a designated range of distances associated with correct positions and/or functions, then the controller can determine that the brake assembly is operating correctly. But, if the relative position is outside of this designated range, then the controller can determine that the brake assembly is not operating correctly. For example, the sensor trigger or sensor may not have moved far enough to ensure that the brake assembly was engaged or disengaged. This determination can be used to notify an operator that the brakes may be applied or not applied, and can be used to prevent re-starting movement of the vehicle (e.g., where the brakes are thought to be released but still engaged).

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. The specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle brake system comprising:
   a status detector including a sensor, a sensor trigger, a carrier, and a housing, the sensor trigger configured to be disposed on the carrier, the carrier configured to be mounted to a first component of a brake assembly, the sensor configured to be disposed at least one of on or in the housing, the housing configured to be mounted to a second component of the brake assembly, at least one of the first component or the second component configured to move relative to the other during engagement or release of the brake assembly, the sensor configured to measure a distance from the sensor to the sensor trigger; and
   a controller configured to be in communication with the sensor and to determine a status or a mode of the brake assembly based at least in part on the distance from the sensor to the sensor trigger.

2. The system according to claim 1, wherein the controller is configured to determine, as the status or the mode, an application status or an application mode indicating whether the brake assembly is engaged or not engaged.

3. The system according to claim 1, wherein the controller is configured to determine, as the status or the mode, an operating status or an operating mode indicating a health status or a maintenance level of the brake assembly.

4. The system according to claim 3, wherein the controller is configured to determine the operating status or the operating mode based at least in part on a rate of movement or a pattern of movement of the sensor trigger relative to the sensor.

5. The system according to claim 1, wherein the second component includes a brake cylinder and the first component includes a piston rod that reciprocally moves relative to the brake cylinder.

6. The system according to claim 5,
   wherein the housing is secured to a mounting plate on a non-pressure head of the brake cylinder.

7. The system according to claim 5,
   wherein the carrier is a carrier pin that is inserted through a clevis of the piston rod.

8. A vehicle brake system detector, comprising:
   a sensor trigger configured to be disposed on a first component of a brake assembly;
   a sensor configured to be disposed on a second component of the brake assembly, at least one of the first component or the second component movable relative to the other during engagement or release of the brake assembly, the sensor configured to measure a distance from the sensor to the sensor trigger; and
   a controller in communication with the sensor, the controller configured to determine a status or a mode of the brake assembly based at least in part on the distance from the sensor to the sensor trigger.

9. The detector according to claim 8, wherein the status or the mode is an application status or an application mode indicating whether the brake assembly is engaged or not engaged.

10. The detector according to claim 8, wherein the status or the mode is an operating status or an operating mode of the brake assembly indicating a health status or a maintenance level.

11. The detector according to claim 10, wherein the controller is configured to determine the operating status or the operating mode of the brake assembly based on a rate at which the distance between the sensor and the sensor trigger changes during the engagement or the release of the brake assembly.

12. The detector according to claim 8, further comprising a housing for mounting the sensor on the second component, the sensor being disposed on, or at least partially within, the housing.

13. The detector according to claim 12, wherein the housing comprises a connector configured to couple the sensor to the controller.

14. The detector according to claim 8, further comprising a carrier configured to mount the sensor trigger on the first component, the sensor trigger being disposed on the carrier.

15. The detector according to claim 14, wherein the brake assembly includes a piston rod, and the carrier is a carrier pin that is inserted through a clevis of the piston rod.

16. The detector according to claim 8, wherein the second component is a stationary component of the brake assembly, and the first component is a movable component of the brake assembly.

17. The detector according to claim 8, wherein the second component includes a brake cylinder of the brake assembly, and the first component is a piston rod of the brake assembly.

18. The detector according to claim 8, wherein the controller is configured to communicate the status or the mode of the brake assembly to a notification device, the notification device configured to output an indication of the status or the mode of the brake assembly for observation by a vehicle operator.

19. The detector according to claim 8, wherein the sensor trigger is a magnet, and the sensor is a magnetic sensor, the sensor configured to measure the distance from the sensor to the sensor trigger based on a level of detected magnetic flux.

20. The detector according to claim 8, wherein the sensor is configured to measure the distance from the sensor to the sensor trigger as being one of a first distance value, a second distance value, or at least one intermediate distance value between the first distance value and the second distance value, and the controller is configured to select the status or the mode of the brake assembly from a range of at least three different statuses or modes based on the distance that is measured.

* * * * *